United States Patent
Ngo

(10) Patent No.: US 6,948,956 B2
(45) Date of Patent: Sep. 27, 2005

(54) ELECTRICAL CONNECTOR WITH MODULE EJECTION SYSTEM

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/800,345

(22) Filed: Mar. 12, 2004

(65) Prior Publication Data

US 2004/0242041 A1 Dec. 2, 2004

Related U.S. Application Data

(63) Continuation-in-part of application No. 10/447,420, filed on May 28, 2003, now Pat. No. 6,848,921.
(60) Provisional application No. 60/475,824, filed on Jun. 3, 2003.

(51) Int. Cl.[7] .............................................. H01R 13/62
(52) U.S. Cl. ....................... 439/155; 439/923; 439/157
(58) Field of Search ............................... 439/152, 155, 439/159, 328, 923, 630

(56) References Cited

U.S. PATENT DOCUMENTS

| | | | |
|---|---|---|---|
| 5,413,497 A | 5/1995 | Lwee | 439/328 |
| 5,499,925 A | 3/1996 | Lwee | 439/157 |
| 5,536,180 A | 7/1996 | Ishida et al. | 439/159 |
| 5,548,484 A | 8/1996 | Kantner | 361/737 |
| 5,558,527 A | 9/1996 | Lin | 439/155 |
| 5,575,669 A | 11/1996 | Lin et al. | 439/157 |
| 6,030,238 A | 2/2000 | Dong | 439/159 |
| 6,203,378 B1 * | 3/2001 | Shobara et al. | 439/638 |
| 6,319,028 B1 * | 11/2001 | Zhang et al. | 439/159 |
| 6,361,338 B1 * | 3/2002 | Chang | 439/159 |
| 6,382,995 B1 * | 5/2002 | Bricaud et al. | 439/159 |
| 6,398,567 B1 * | 6/2002 | Nishimura | 439/159 |
| 6,408,352 B1 * | 6/2002 | Hosaka et al. | 710/301 |
| 6,572,392 B2 | 6/2003 | Motojima | 439/159 |

FOREIGN PATENT DOCUMENTS

FR        2735599 A1    12/1996

* cited by examiner

*Primary Examiner*—Hien Vu
(74) *Attorney, Agent, or Firm*—Harrington & Smith, LLP

(57) ABSTRACT

An electrical connector including a frame, electrical contacts and a system for retaining and ejecting an electronic module with the electrical contacts. The frame has a receiving area which is sized and shaped to removably receive an end of at least one electronic module. The electrical contacts are connected to the frame. The contacts include spring contacts adapted to make removable connection to contact pads on the end of the electronic module at a first inserted position. The system for retaining and ejecting the electronic module with the electrical contacts includes at least one ejection unit having a spring, a pusher and a guide connected between the frame and a guide channel in the pusher. The ejection unit is adapted to stationarily locate the pusher at two positions on the frame based upon biasing force of the spring and upon location of the guide in the guide channel.

20 Claims, 20 Drawing Sheets

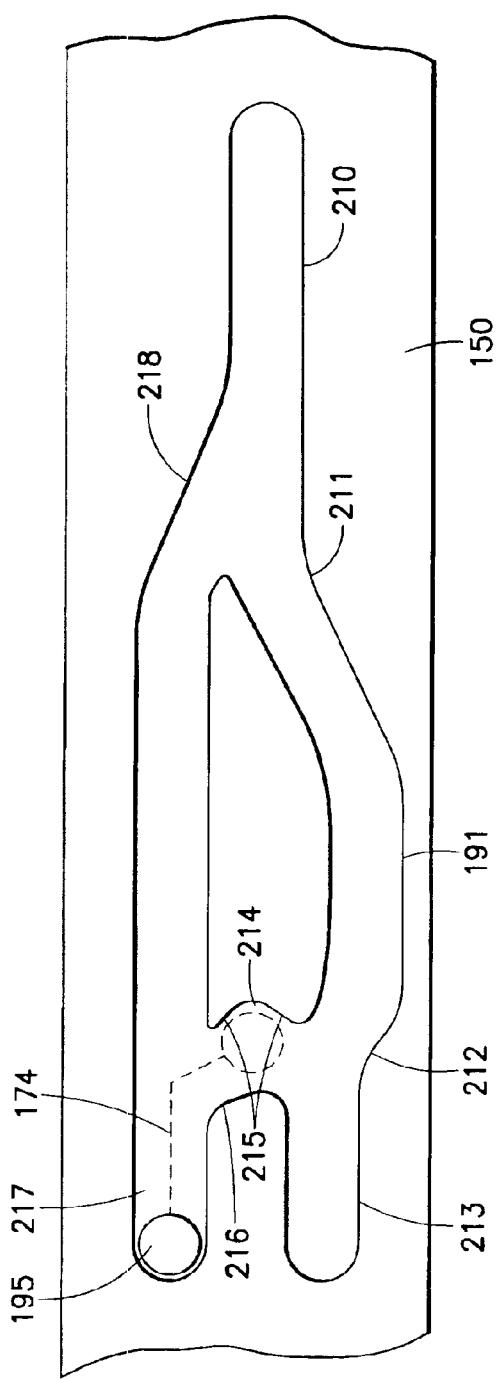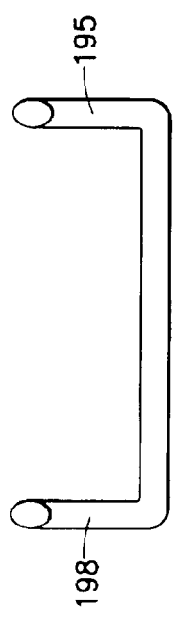
FIG. 23
FIG. 24

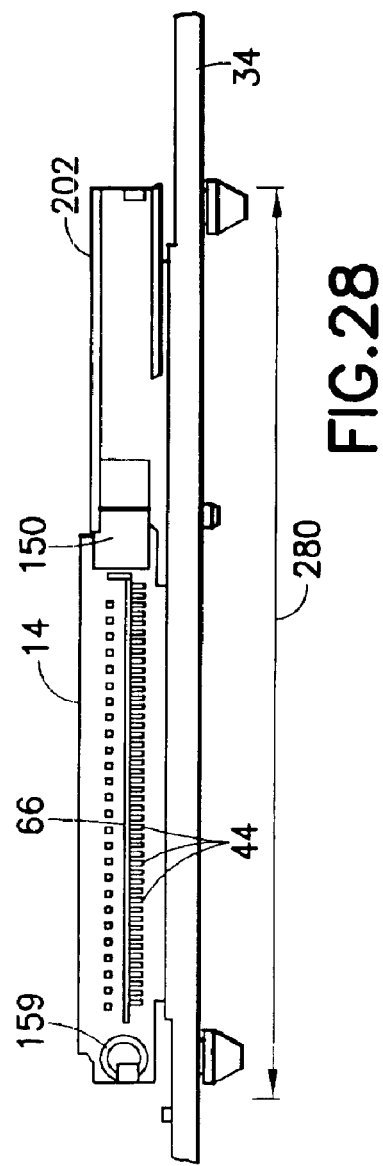
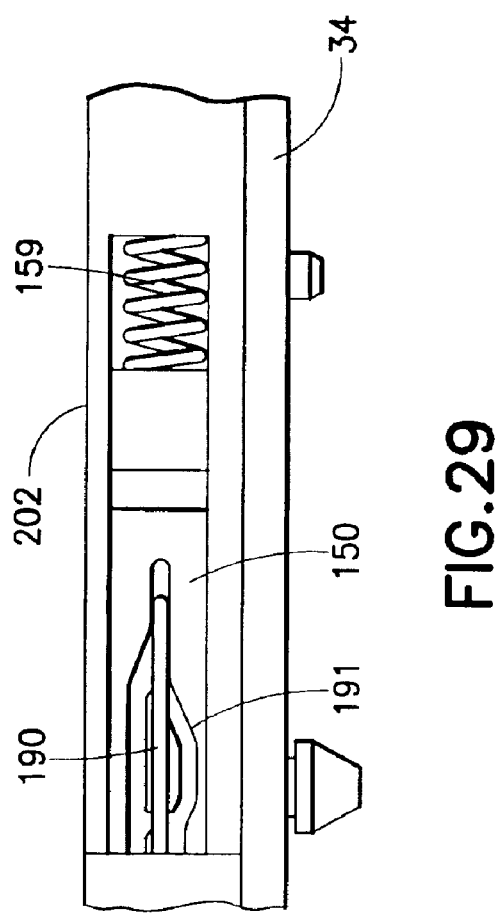

ELECTRICAL CONNECTOR WITH MODULE EJECTION SYSTEM

CROSS REFERENCE TO RELATED APPLICATIONS

This application is a continuation-in-part of U.S. application Ser. No. 10/447,420 filed May 28, 2003 now U.S. Pat. No. 6,848,921. This application claims priority under. 35 U.S.C. §119(e) on U.S. Provisional Patent Application No. 60/475,824 filed Jun. 3, 2003.

BACKGROUND OF THE INVENTION

1. Field of the Invention

The present invention relates to electrical connectors and, more particularly, to a system for retaining and ejecting an electronic module with an electrical connector.

2. Brief Description of Prior Developments

As is well known, many of today's laptop, notebook, desktop and other computers, as well as computer peripherals and other electronic products, are designed to receive removable devices such as cards conforming to standards established by the Personal Computer Memory Card International Association (PCMCIA). These standards define the electrical and physical specifications of the card including the interfaces between the card and the port or slot into which the card is inserted. The specifications include a 16-bit PC Card interface and a 32-bit CardBus interface. The PCMCIA standards also specify three card form factors, called Type I, Type II and Type III. All three card types measure the same length (85.6 mm) and the same width (54.0 mm), and differ only in overall thickness or height. The Type I card has a thickness of 3.3 mm. The Type II card has a thickness of 5.0 mm. The Type III card has a thickness of 10.5 mm. PCMCIA cards may be used for various purposes. For example, Type I cards are typically used for memory devices. Type II cards are typically used for I/O devices. Type III cards are typically used to house rotating mass storage devices (disk drives). Presently, Type II cards are used principally as communication links, for example, for connecting the user of a host system such as a portable computer to an Ethernet LAN, as a data/fax modem for connecting the user to a subscriber telephone line system, or as a combined LAN and modem card.

There is a proposal for new types of PCMCIA cards or modules for electronic devices, such as laptop computers. The new types of PCMCIA cards can include a larger width or double width card and a smaller width or single width card (such as a Type I, II, or III card for example). There is a desire to provide an electrical connector which can receive either the larger width card or, alternatively, two of the smaller width cards in a side-by-side configuration.

There is also a desire to provide a PCMCIA electrical connector which has an ejection system that provides a positive lock when the PCMCIA card is inserted, and which also provides for control over the position in which the PCMCIA card will reside after either one of being inserted and being ejected.

SUMMARY OF THE INVENTION

In accordance with one aspect of the present invention, an electrical connector is provided including a frame, electrical contacts and a system for retaining and ejecting an electronic module with the electrical contacts. The frame has a receiving area which is sized and shaped to removably receive an end of at least one electronic module. The electrical contacts are connected to the frame. The contacts include spring contacts adapted to make removable connection to contact pads on the end of the electronic module at a first inserted position. The system for retaining and ejecting the electronic module with the electrical contacts includes at least one ejection unit having a spring, a pusher and a guide connected between the frame and a guide channel in the pusher. The ejection unit is adapted to stationarily locate the pusher at two positions on the frame based upon biasing force of the spring and upon location of the guide in the guide channel.

The teachings of the disclosure herein provide for benefits that include a positive lock, and increased control over the ending and ejecting positions of an electronic module. The teachings herein provide for ejecting the module straight out from the receiving area, with reduced forces required.

In accordance with another aspect of the present invention, an electrical connector is provided comprising a frame, electrical contacts, and an ejecting system. The frame has a receiving area which is sized and shaped to removably receive an end of at least one electronic module. The electrical contacts are connected to the frame and are adapted to make removable connection with contacts on an electronic module inserted into the receiving area. The ejecting system is for ejecting the electronic module from connection with the electrical contacts. The ejecting system comprises a spring, a pusher connected to the spring and adapted to push against the electronic module, and a movable guide connected to the frame. The pusher comprises a guide track. The guide extends into the guide track and the guide track is sized and shaped to cooperate with the guide to form a latch for the pusher at a mated position of the electronic module into the receiving area. In the mated position, the electrical contacts make electrical connection with the electronic module and the latch prevents the spring from exerting a force against the electronic module.

In accordance with another aspect of the present invention, an electrical connector is provided comprising a frame, electrical contacts, a control and support spring, and a latchable ejecting unit. The frame has a receiving area which is sized and shaped to removably receive a front end of at least one electronic module. The electrical contacts are connected to the frame and are adapted to make removable connection with contacts on an electronic module inserted into the receiving area. The control and support spring is connected to the frame and extends into the receiving area from a rear end of the receiving area. The control and support spring is adapted to be deformed by the electronic module only when a first side of the front end of the electronic module is inserted past a mating position in the receiving area. The latchable ejecting unit is connected to the frame and comprises a spring, a pusher biased by the spring between an un-mated ejection position and an over-moved end position, and a latching system to latch the pusher at an intermediate latched position. The pusher is contacted by the electronic module at a second side of the front end of the electronic module to move the pusher.

In accordance with one method of the present invention, a method of connecting an electronic module to an electrical connector is provided comprising steps of inserting the electronic module into a receiving area of the electrical connector; pushing a pusher of the electrical connector by the electronic module from an un-mated ejection position to an over-moved end position; and moving the electronic module by the pusher from an over-inserted first inserted position to a mated second inserted position with the pusher being moved at an intermediate latched position. To move the electronic module from the mated position to a partially ejected position by the pusher, the pusher is moved from the intermediate latched position to the over-moved end position to allow the pusher to return to the un-mated ejection position and push the electronic module outward to the partially ejected position.

BRIEF DESCRIPTION OF THE DRAWINGS

The foregoing aspects and other features of the present invention are explained in the following description, taken in connection with the accompanying drawings, wherein:

FIG. 23 is a side view of the pusher guide channel similar to FIG. 22 when the electronic module is at its over-inserted position after being moved from the mated position;

FIG. 24 is an illustration of a pin or guide for use in conjunction with the pusher guide channel;

FIG. 28 is a front view of the printed circuit board and connector shown in FIG. 27;

FIG. 29 is a partial side view of the printed circuit board and connector shown in FIG. 28 showing the side ejection unit;

DETAILED DESCRIPTION OF THE PREFERRED EMBODIMENTS

Figure 1:
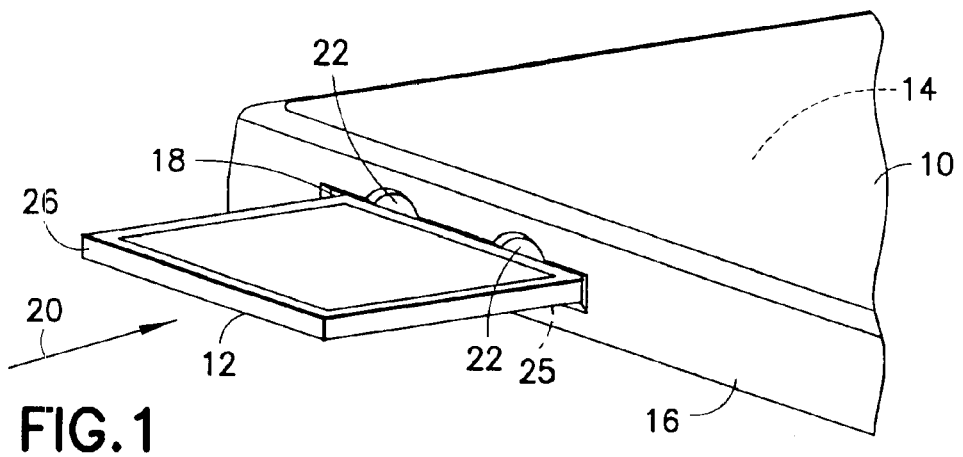
FIG. 1 is a partial perspective view of an electronic device with a removable electronic module, the electronic device comprising an electrical connector incorporating features of the present invention.

Referring to FIG. 1, there is shown a partial perspective view of an electronic device 10 with a removable electronic module 12. The module 12 is intended to be connected to the electronic device in a receiving slot 18 and by an electrical connector 14 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The electronic device 10 generally comprises a laptop or notebook computer. However, features of the present invention could be incorporated into any suitable type of electronic device adapted to receive a removable electronic module. The electronic module 12 comprises a PCMCIA card. The electronic module 12 is different from prior PCMCIA cards. More specifically, the PCMCIA card 12 is wider than conventional PCMCIA cards. However, features of the present invention could be used with conventional PCMCIA cards.

Figure 2:
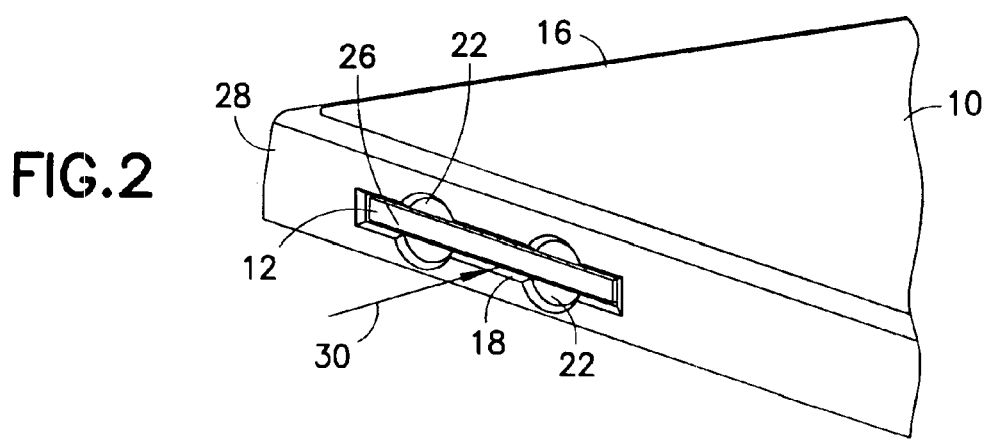
FIG. 2 is a partial perspective view of the electronic device and module as shown in FIG. 1 with the module inserted to a mated inserted position.
Figure 3:
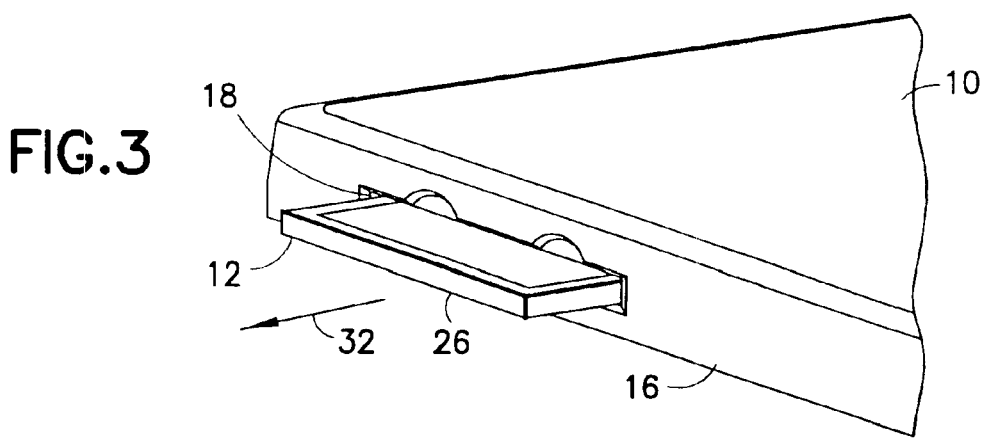
FIG. 3 is a partial perspective view of the electronic device and module as shown in FIG. 2 with the module partially ejected.

Referring also to FIGS. 2 and 3, the electrical connector 14 of the present invention uses a push-push connection system (i.e., a push-to-connect and a push-to-eject connection system) as further described below. The electronic device 10 comprises a housing 16. The housing 16 comprises a slot 18. The slot 18 is sized and shaped to removably receive the electronic module 12. The electronic module 12 can be slid into the slot 18 as indicated by arrow 20. The entrance to the slot 18 includes two recessed areas 22. The slot 18 bisects each of the two recessed areas 22. The leading edge or front edge 24 of the electronic module 12 (see FIG. 5) includes an electrical connection section 25. The electrical connection section 25 makes electrical connection to the electrical connector 14 when the electronic module 12 is inserted into a fully connected mated position as shown in FIG. 2. In this mated position, the rear end 26 of the electronic module 12 is substantially flush with the side 28 of the housing 16. However, when the electronic module 12 is at the mated position, the recessed areas 22 are located further in from the rear end 26 of the module.

FIG. 3 shows the electronic module 12 at a partially ejected position. In order to partially eject the electronic module 12, the rear end 26 of the electronic module 12 is pressed inward as indicated by arrow 30 in FIG. 2 by one or more fingers of a user into the recessed areas 22. The push-to-eject system requires a user to quickly release contact with the module 12 to allow the module to be partially ejected as indicated by arrow 32 into the position as shown in FIG. 3 by springs in the electrical connector 14. Sufficient area of the electronic module 12 is then available for the user to pull the module 12 out of the slot 18 as indicated by arrow 32.

Figure 4:
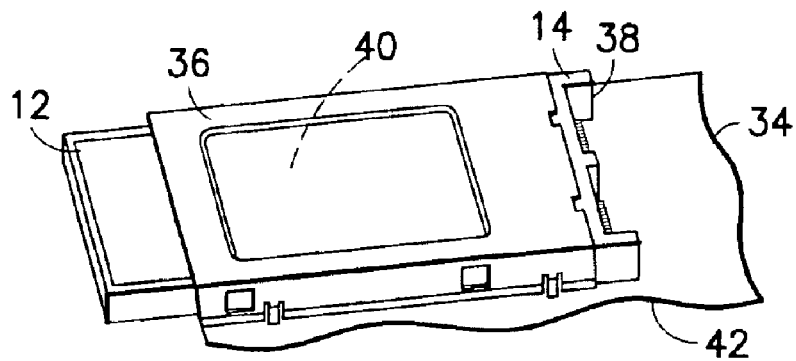
FIG. 4 is a partial perspective view of the electrical connector used in the electronic device shown in FIG. 1 shown attached to a printed circuit board and having the module inserted into the connector.
Figure 5:
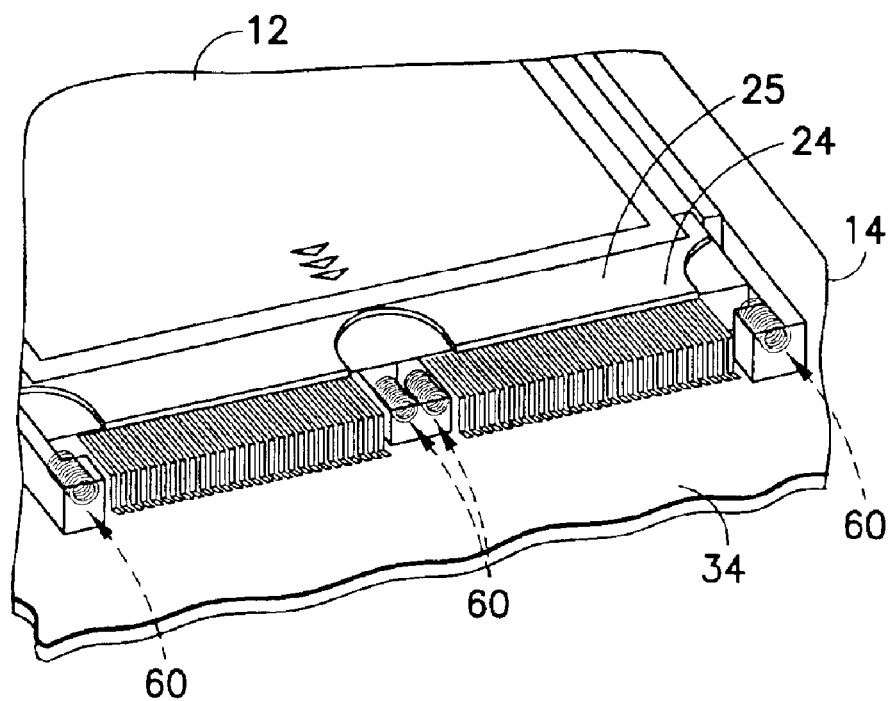
FIG. 5 is a partial enlarged perspective view of the electrical connector, printed circuit board, and module shown in FIG. 4, but with the EMI shield removed for clarity.

Referring now also to FIGS. 4–5, the electrical connector 14 is located inside the housing 16 and, more specifically, is attached to a printed circuit board 34. In this embodiment, the electrical connector 14 includes an electromagnetic interference (EMI) shield 36. In alternate embodiments, the EMI shield 36 might not be provided. The shield 36 is directly attached to the printed circuit board 34 and extends from the rear end of the slot 18 to the main connection section 38 of the electrical connector 14. The shield 36 covers a top side and two lateral sides of a receiving area 40 which receives the inserted electronic module 12.

Figure 6:
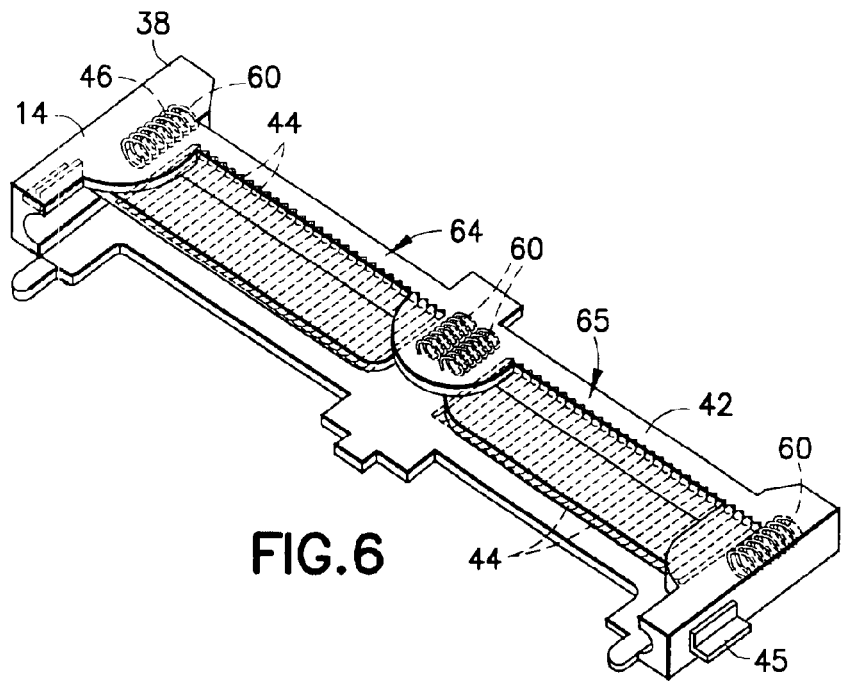
FIG. 6 is a perspective view of the electrical connector shown in FIG. 5.
Figure 7:
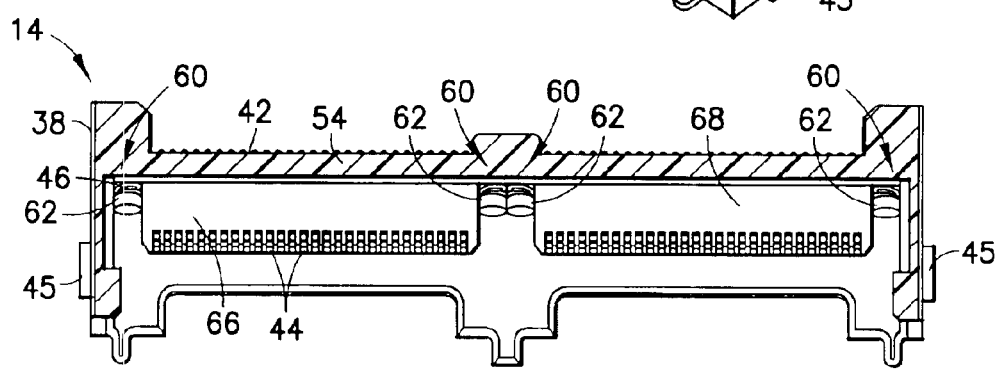
FIG. 7 is a cross sectional view of the electrical connector shown in FIG. 6.
Figure 8:
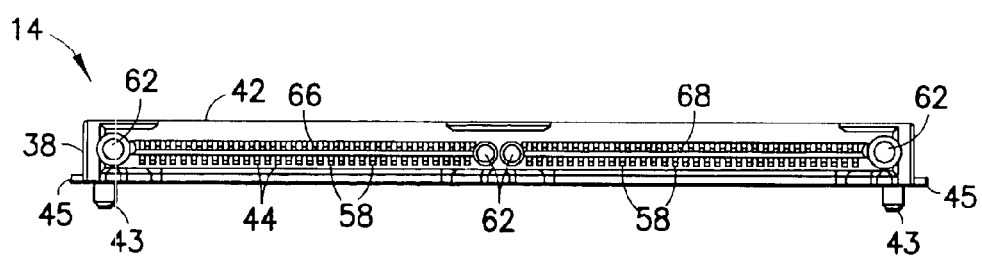
FIG. 8 is a front elevational view of the electrical connector shown in FIG. 6.

Referring also to FIGS. 6–8, the main connection section 38 generally comprises a housing or frame 42, electrical contacts 44, and a system 46 for retaining and ejecting the electronic module 12 with the electrical contacts 44. The housing 42 is preferably comprised of dielectric material, such as molded plastic or polymer material. The housing 42 is adapted to be directly mounted to the printed circuit board 34, such as by through-hole mounting posts 43 and solder brackets 45. The housing 42 forms a receiving area 48 which is sized and shaped to receive the leading end 24 of the electronic module 12. The housing 42 comprises a bottom 50, two lateral sides 52, a back wall 54, and top sections 56 which define the receiving area 48. The housing 42 also comprises two contact support sections 66, 68. The contact support sections extend in a general cantilevered fashion forward from the back wall 54 into the receiving area 48.

The electrical contacts 44 comprise spring contacts. The electrical contacts 44 comprise rear ends which are connected to the printed circuit board 34, such as by through-hole mounting or by surface solder mounting. The electrical contacts 44 extend through the back wall 54, through the contact support sections 66, 68 and have contact areas 58 which extend downward through holes in the contacts support sections 66, 68 and into the bottom of the receiving area 48. In the embodiment shown, the electrical contacts 44 are arranged in two arrays 64, 65; one array at each one of the contact support sections 66, 68.

The retaining and ejecting system 46 generally comprises springs 60 connected to the housing 42. In the embodiment shown, the springs 60 include pusher caps 62 at their front ends. In an alternate embodiment, the pusher caps 62 might not be provided. The springs could directly contact the electronic module(s). Preferably, the springs 60 are located against the back wall 54 of the housing. Two of the springs are located at opposite lateral ends of the receiving area 48. The other two springs are located in the middle of the receiving area; between the contact support sections 66, 68 and laterally next to each other. As seen best in FIG. 7, the front ends of the pusher caps 62 are located behind the contact areas 58 of the electrical contacts 44. The front ends of the pusher caps 62 are also located in front of the back wall 54. The pusher caps 62 can be moved back towards the back wall 54 with the springs 60 being compressed. The back wall 54 comprises recessed areas to accommodate the springs 60 and the pusher caps 62.

Figure 9:
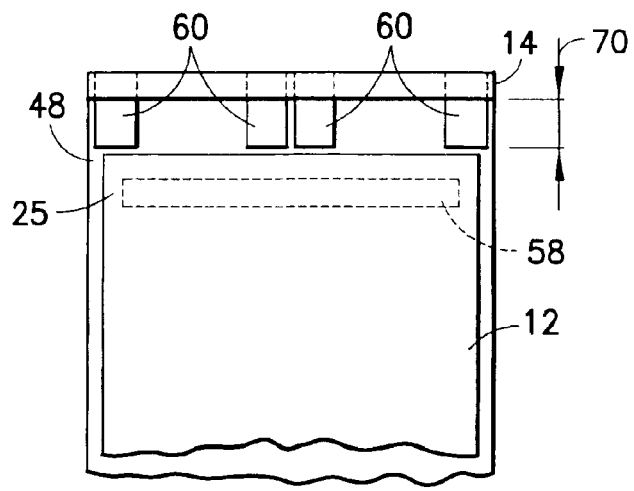
FIG. 9 is a schematic top view showing the electronic module and electrical connector at the position shown in FIG. 2.
Figure 10:
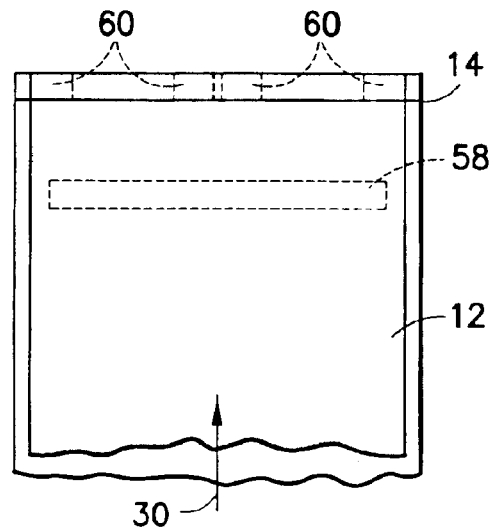
FIG. 10 is a schematic top view as in FIG. 9 showing the electronic module inserted to an over-moved position past the mated inserted position shown in FIG. 9.
Figure 11:
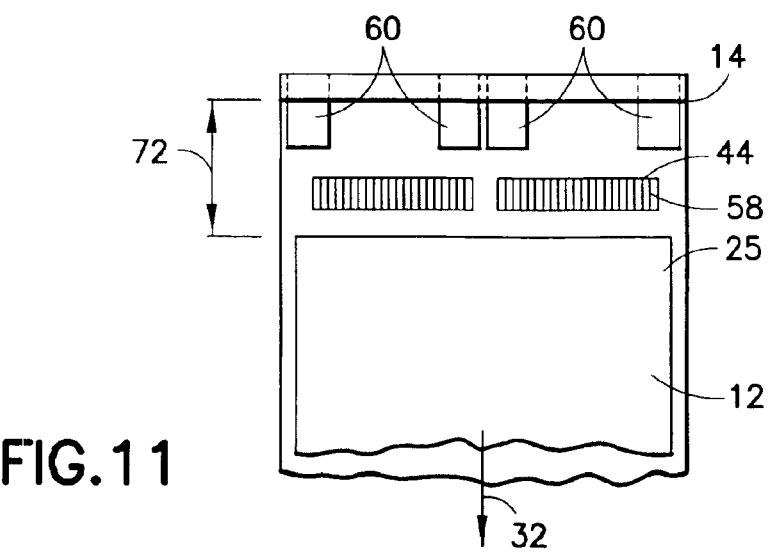
FIG. 11 is a schematic top view as in FIGS. 9 and 10 showing the electronic module ejected by the springs the contact sections of the electrical contacts to the position shown in FIG. 3.

Referring now also to FIGS. 9–11, there are shown schematic illustrations showing the front end of the electronic module 12 at various positions. FIG. 9 shows the electronic module 12 at the mated position corresponding to FIG. 2. In this mated position the electrical connection section 25 of the electronic module 12 is located in the receiving area 48. More specifically, electrical contact pads on the electrical connection section 25 are in electrical contact with the downward extending contact areas 58 of the electrical contacts 44. FIG. 10 shows the electronic module 12 in an over-inserted position, wherein the springs 60 are compressed. FIG. 11 shows the resulting partially ejected position of the electronic module 12 after the compression of the springs 60 push the module 12 outward. In FIG. 11, the electronic module 12 has been forced out of the contact area 58, in the direction of arrow 32. Thus, the rear end 26 of the electronic module 12 (shown in FIG. 3) is exposed sufficiently such that it can be grasped by a user for removal from the electronic device 10.

When the module 12 is moved from its over-inserted position to its mated position, the springs 60 move the module as the user relatively slowly releases pushing pressure against the rear end of the module. The springs 60 stop pushing the module 12 outward when the front end of the module reaches the mated position shown in FIG. 9 merely because the springs 60 are no longer substantially compressed; the springs are substantially extended to their normal home shapes. Ejection of the module 12 to its partially ejected position only occurs when the user relatively quickly releases pushing force against the rear end of the module when the module is at its over-inserted position. Once the module is stationary at its mated position, the contacts 44 can retain the module at its mated position.

Figure 12:
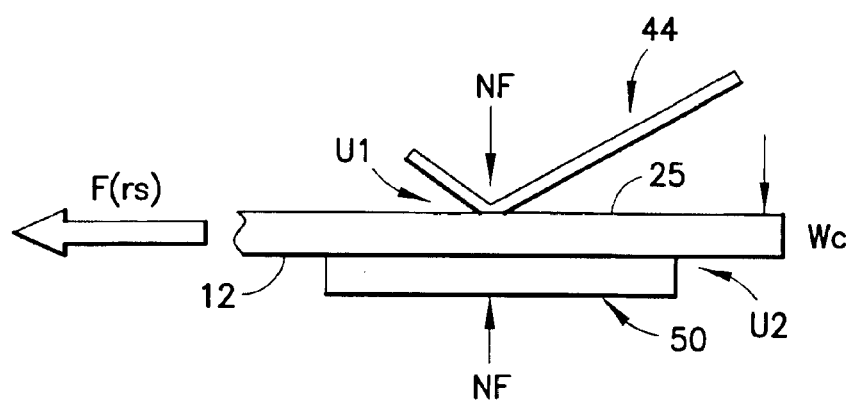
FIG. 12 is a schematic diagram showing contact of the electrical connector with the electrical connection section of the electronic module.

Referring to FIG. 12, the retainment of the electronic module 12 with the electrical connector 14 is provided by contact of the electrical connection section 25 between the electrical contacts 44 and the bottom 50 of the housing 42. More specifically, the contacts 44 bias the electrical connection section 25 against the top side of the bottom 50 of the housing. Frictional forces between the contact 44 and the electrical connection section 25, and between the electrical connection section 25 and the bottom 50 of the housing provide sufficient retainment force to retain the electronic module 12 inside the slot 18.

The release force necessary to release the frictional retainment of the electronic module 12 with the contacts 44 generally comprises:

$$F(rs) > [2 \ (U_1 \times N_c \times NF) + (U_2 \times W_c)]$$

where, $F(rs)$ is the module releasing spring force; $U_1$ is the coefficient of friction of contact; $N_c$ is the number of contacts; $NF$ is the normal force; $U_2$ is the coefficient of friction of the housing or frame; and $W_c$ is the module weight.

Figure 13:
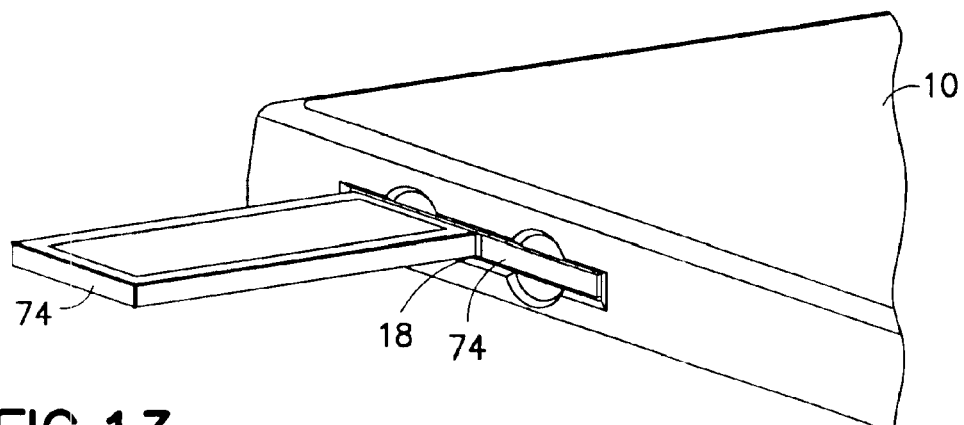
FIG. 13 is a partial perspective view of the electronic device shown in FIG. 1 and showing two second single width electronic modules; one connected to the electronic device and the electrical connector shown in FIGS. 4–8 and the other about to be inserted into the device or being removed.
Figure 14:
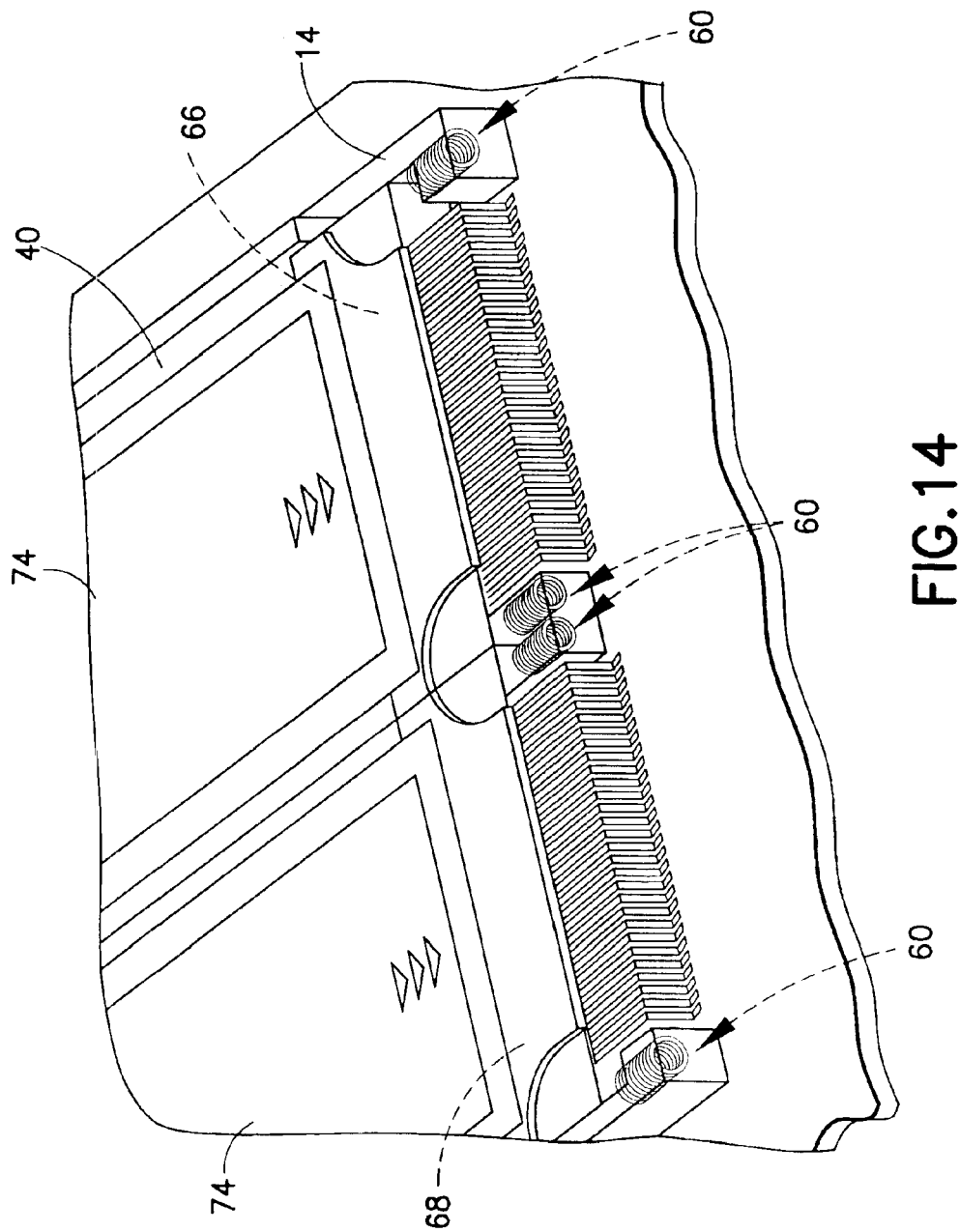
FIG. 14 is a partial perspective view of the two second electronic modules shown in FIG. 13 shown connected to the electrical connector.

Referring now also to FIGS. 13 and 14, further aspects of the electrical connector 14 of the present invention are shown. The electrical connector 14 is adapted to alternatively receive two second electronic modules 74. The second electronic modules 74 have a smaller width than the first electronic module 12; a little less than one-half the width. The two second modules 74 can be inserted into the slot 18 next to each other in a side-by-side configuration. One of the second modules 74 can receive the first contact support section 66 and make electrical connection with the electrical contacts on the first contact support section. The second one of the second modules 74 can receive the second contact support section 68 and make electrical connection with the electrical contacts on the second contact support section. Thus, the two modules 74 can be separately inserted and separately ejected from the receiving area 40. The electromagnetic interference (EMI) cover 36 (see FIG. 4) can cover the top side of the receiving area and has a width for covering a top side of the first electronic module or top sides of the two second thinner width electronic modules.

Figure 15:
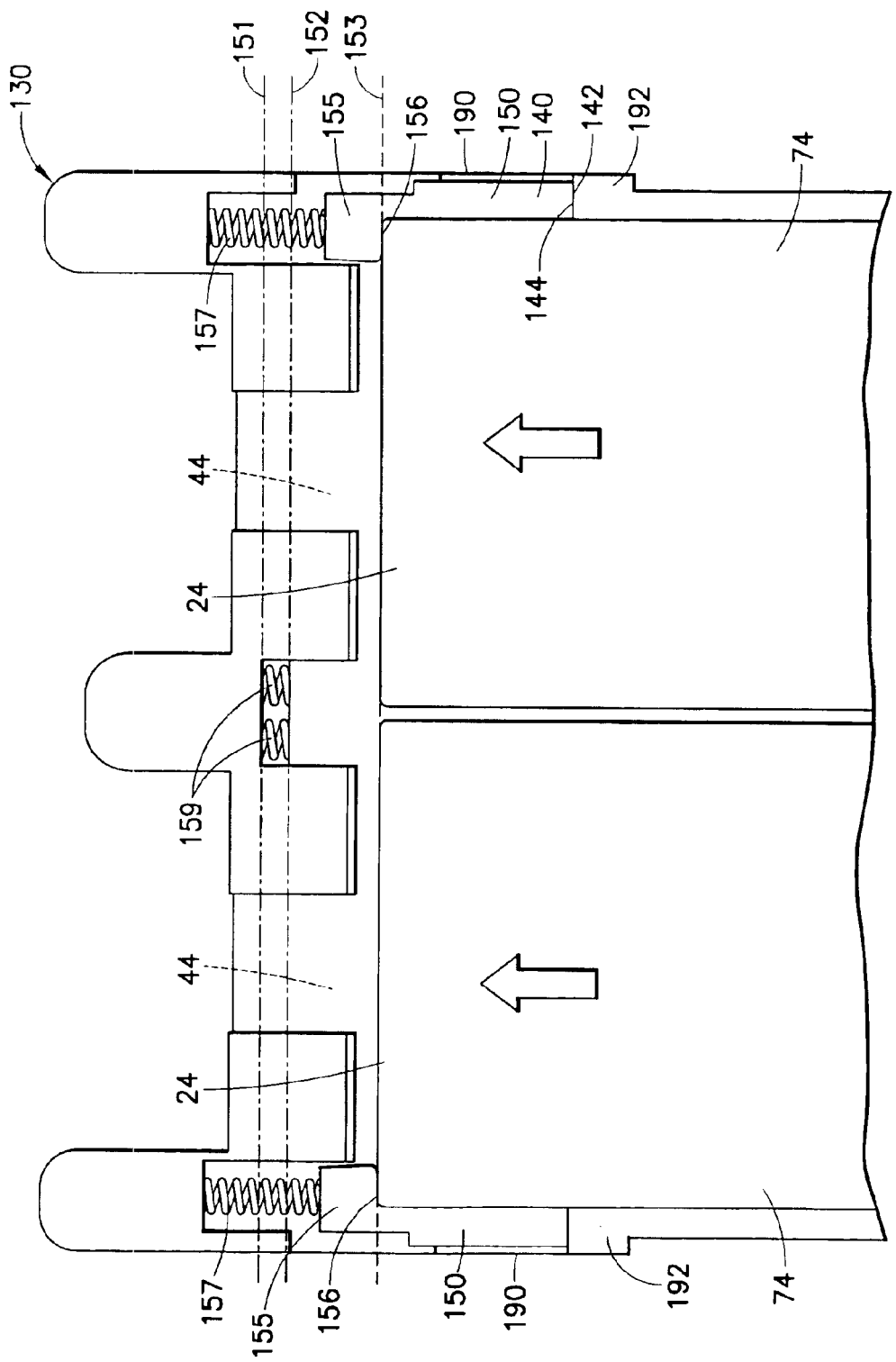
FIG. 15 is a top view of an alternate embodiment of an electrical connector incorporating features of the present invention with side mounted ejecting units in conjunction with two electronic modules shown at partially ejected or initially inserted positions.

Referring to FIG. 15, there is shown an alternate embodiment of an electrical connector 130 incorporating features of the present invention. The electrical connector 130 uses a push-push connection system (i.e., a push-to-connect and a push-to-eject connection system). The electrical connector 130 generally comprises a frame 192, electrical contacts 44 and a module ejecting system 140. The ejecting system 140 generally comprises two side mounted ejecting units 150 and two control and support springs 159. In an alternate embodiment the support springs 159 might not be included, and more or less than two ejecting units could be provided. The side mounted ejecting units 150 each comprise a pushing head or pusher 155, a side spring 157, and a guide pin 190 (see FIG. 18). The side springs 157 provide a biasing force against the pushing heads 155. A laterally inwardly extending overhang 156 on each of the pushing heads 155 provides a surface for pushing contact between the electronic modules 74 and the pushing heads 155.

The frame or housing 192 is similar to the frame shown in the embodiment of FIGS. 1–14. The frame 192 is preferably comprised of dielectric material, such as molded plastic or polymer material. The frame is adapted to be directly mounted to the printed circuit board, such as by through-hole mounting posts and solder brackets. The frame forms a receiving area which is sized and shaped to receive the leading end of one double width electronic module 12 or two side-by-side single width electronic modules 74. The frame comprises a bottom, two lateral sides, a back wall, and top sections which define the receiving area. The frame also comprises two contact support sections. The contact support sections extend in a general cantilevered fashion forward from the back wall into the receiving area. The back wall and contact support sections are identical to the back wall and contact support sections described above with reference to the embodiment of FIGS. 1–14.

The electrical contacts 44 comprise spring contacts and are the same as those described in reference to the embodiment of FIGS. 1–14. The electrical contacts 44 comprise rear ends which are connected to the printed circuit board, such as by through-hole mounting or by surface solder mounting. The electrical contacts 44 extend through the back wall, through the contact support sections and have contact areas which extend downward through holes in the contacts support sections and into the bottom of the receiving area. In the embodiment shown, the electrical contacts 44 are arranged in two arrays; one array at each one of the contact support sections.

Figure 16:
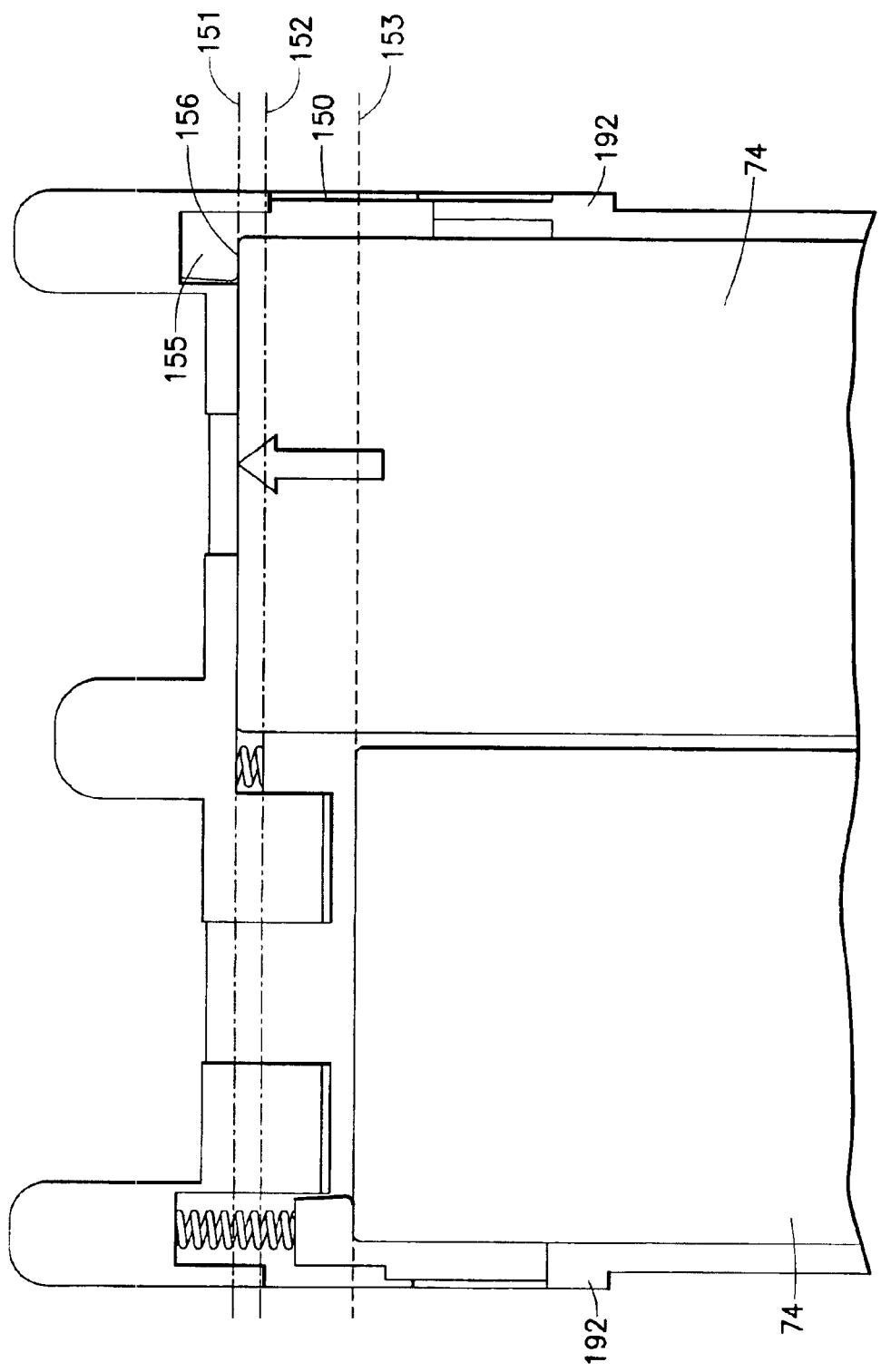
FIG. 16 is a top view of the connector and modules as in FIG. 15 wherein one electronic module has been moved to an end zone or over-inserted position.
Figure 17:
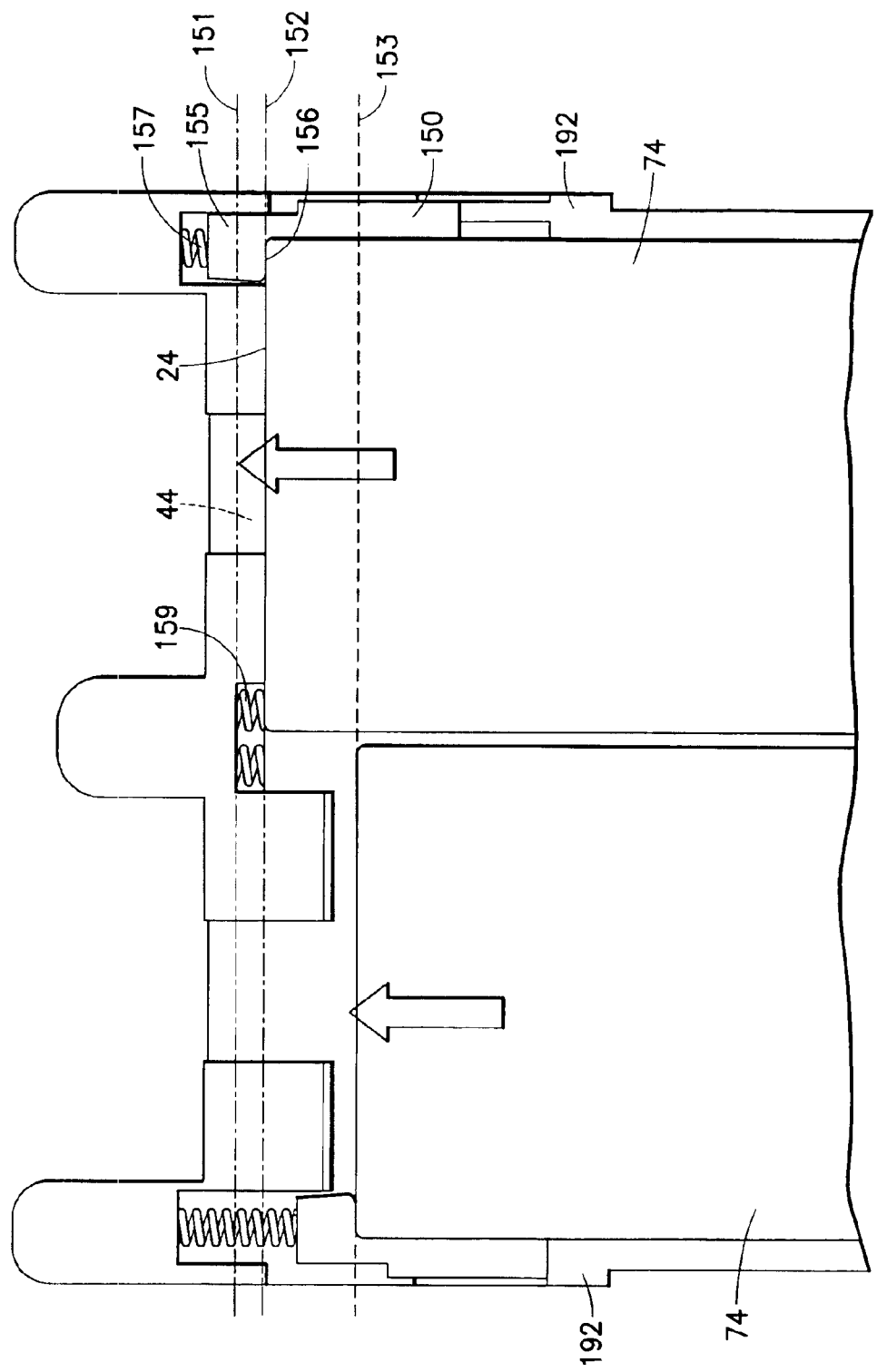
FIG. 17 is a top view of the connector and modules as in FIG. 16 wherein one electronic module has been moved to rest in a mating zone at a mated position.

FIGS. 15–17 show the ejecting system 140 at various different positions. As will become apparent, the ejecting system 140 works in cooperation with frictional and other forces (similar to that discussed with reference to FIG. 12 above) to provide for control over the movement of the modules 74 or the wider module 12.

In FIG. 15, the two modules 74 have been inserted into the connector, but have not made mechanical and electrical connection with the contacts of the connector and have not been engaged with any substantial holding force by the connector (i.e., inserted to a partially ejected or initially inserted position). The leading ends 24 of the electronic modules 74 are positioned at the beginning of an ejecting zone as indicated by line 153. The front ends of the modules 74 have not contacted the springs 159. Therefore, no compression force is exerted on the springs 159 in this position. The springs 157 bias the pusher heads 155 at extended, outward positions (also referred to herein as an un-mated position or ejection position). The front ends 142 of the pusher heads 155 are biased against the surfaces 144 of the frame 192. The front ends 24 of the modules 74 contact the overhangs 156 in this position, but have not moved the pusher heads 155 off of their contact with the frame 192. FIGS. 16 and 17 illustrate connection of the right module 74 to the connector. The left electronic module 74 is illustrated as not having been moved forward and is shown for reference purposes. The left module can be connected and disconnected at the left side of the connector the same way as the right module is connected and disconnected as described below.

Figure 18:
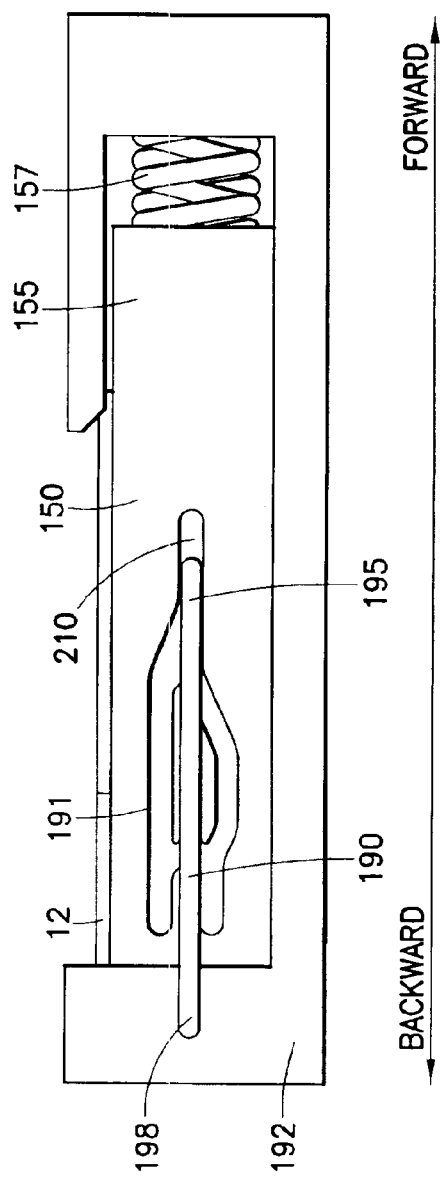
FIG. 18 is a side view of the side mounted ejection mechanism in an unmated or ejection position.
Figure 20:
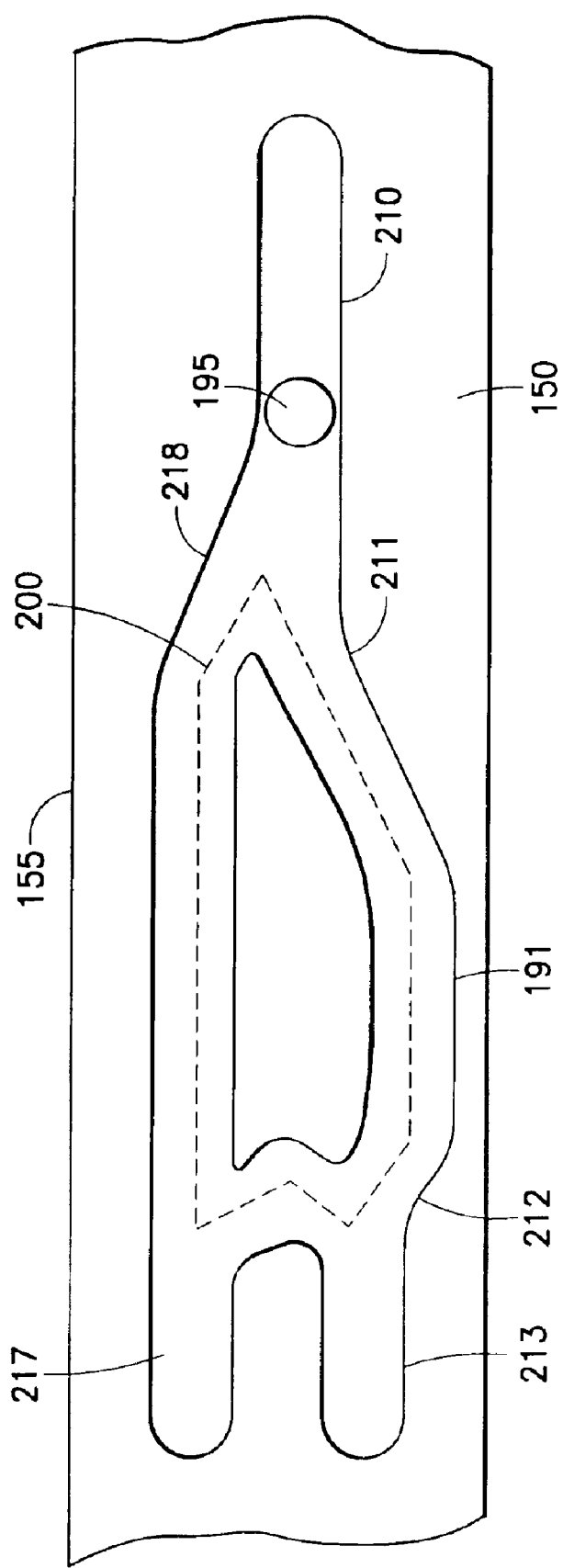
FIG. 20 is a side view of the pusher guide channel showing the portion of the guide in the guide channel when the electronic module is at its partially ejected position.

Referring also to FIGS. 18 and 20, the pusher heads 155 each comprise a pusher guide channel 191 on an exterior lateral side. The pusher guide channel 191 serves as a guide to the guide pin 190 and, which cooperate to form a latch for the ejection unit. As seen best in FIG. 20, the pusher guide channel 191 is generally a closed loop 200 (shown by the dashed line), with additional extensions 210, 213, 217 for permitting travel of the pin head 195 of the guide pin 190.

As seen in FIG. 24, the pin 190 is generally "U" shaped, and comprises a pin tail 198 and a pin head 195. In other embodiments, the pin 190 could have any suitable shape, such as "S" shaped for example. When the leading end 24 of the module 74 is in the ejecting zone 153 as seen in FIG. 15, the pin head 195 generally resides in a first extension 210 of the guide channel as seen in FIGS. 18 and 20. As shown in FIG. 18, the pin tail 198 is rotatably mounted to the frame 192. The pin head 195 is located in the pusher guide channel 191. The pin head 195 is adapted to slide along the channel 191 as the pusher head 155 is moved on the frame 192. During operation of the ejecting unit 150, the pin head 195 follows the path established by the pusher guide channel 191. In FIG. 18, the ejecting unit 150 is shown in its un-mated, ejection position. That is, substantially no force is applied to the ejecting unit 150 by the module 74. In this position, the leading ends 24 of the modules 74 reside in the ejecting zone 153 as seen in FIG. 15.

As the user pushes the right module 74 inward, the pusher 155 of the ejecting unit 150 travels inward. Although it is recognized that the pusher guide channel 191 actually moves inward, for the sake of convenience, movement of the pusher guide channel 191 relative to the pin head 195 is generally referred to as the movement of the pin head 195.

With the front of the right module 74 located at the start of the ejecting zone 153 as seen in FIG. 15, a user (not shown) exerts an insertion force applied to the rear end of the right module. The right module 74 is moved from its partially inserted position shown in FIG. 15 to its over-inserted position shown in FIG. 17. The right electronic module 74 is moved forward past the start of the ejecting zone 153 and past the end of the mating zone, as indicated by line 152, to an end zone 151 at the front surface of the rear wall of the frame 192. As the right module 74 is moved in, the right side pusher head 155 is also moved inward because of the contact of the module 74 with the overhang 156. The right side spring 157 is compressed as the right side pusher head 155 moves inward. When the right module moves past the rear end 152 of the mating zone towards the over-inserted position, the front left side of the module 74 contacts the right one of the center springs 159 and compresses it inward also.

Figure 21:
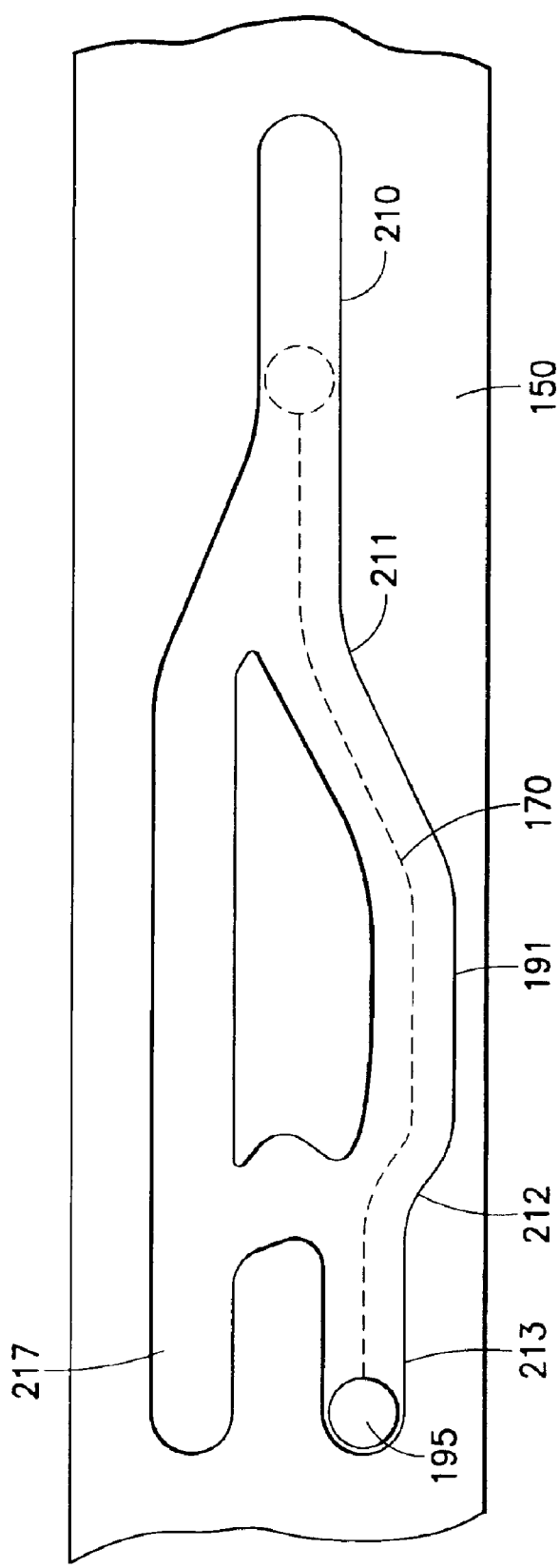
FIG. 21 is a side view of the pusher guide channel similar to FIG. 20 when the electronic module is at its over-inserted position.

Referring also to FIG. 21, as the pusher head 155 is moved inward the pin head 195 first moves along the channel 191 from its position shown in FIG. 20 to the position shown in FIG. 21. This movement and its path is illustrated by the dotted line 170. Forward movement of the module 74, and therefore the ejecting unit 150, causes the pin head 195 to move out of the first extension 210 and into a first downward slope 211. The pin head 195 generally travels along the bottom portion of the loop 200, where it reaches a first uphill slope 212. When the user pushes the module 12 far enough forward, the pin head 195 enters the second extension 213 and is moved into the tail end of the second extension 213. Once the pin head 195 is in the tail end of the second extension 213, further forward movement of the module 74 is restricted by the front side of the rear wall of the frame 192. When the pin head 195 is in the tail end of the second extension 213, the ejecting unit 150 is in the position shown in FIG. 16 (i.e., the over-moved position or end position). The leading end 24 of the module 74 is positioned in the end zone 151 against the front side of the rear wall of the frame.

Once the module 74 is positioned in the end zone 151 at its over-inserted position, the user will cease pushing the module 74 forward, and release pushing force against the module 74. Upon release of the pushing force against the module 74, the spring 157 forces the pusher 155 forward. When the user releases pushing force on the right module 74 the module is pushed by the right center spring 159 and right side pusher head 155 and spring 157 into the mated position shown in FIG. 17 with the front end 24 moving back to the end of the mating zone 152 and the contacts 44 in electrical connection with the contact pads on the module 74.

The spring 159 is shorter than the spring 157. The spring 159 is designed to function the same way as the spring 60 described above with regard to FIGS. 1–14. More specifically, the front end of the spring 159 is located at or behind the rear end 152 of the mating zone. The spring 159 is only depressed when the front end of the module 74 is moved past the rear end 152 of the mating zone. However, the user does not need to relatively slowly release the module 74 from its over-inserted position when being moved to the mated position because the ejecting unit will latch at its intermediate latched position and because the single spring 159 will not have enough force to eject the module 74 to its partially ejected position by itself. The spring 159 will not exert any substantial force on the module when the module is stationary at its mated position because the spring 159 will be at its home, uncompressed shape when the module 74 is at its mated position. Thus, the spring 159 is not substantially loaded when the module is at its mated position. When moving the module 74 from its mated position to its partially ejected position, the force from the spring 159 can function similar to the spring 60 to move the module to its partially ejected position with the cooperation of the ejecting unit 150. Because the spring 157 can be relatively strong, because of the latching feature provided in the ejecting unit 150, the user also does not need to relatively quickly release pushing force when moving the module from its over-inserted position to its partially ejected position.

Figure 19:
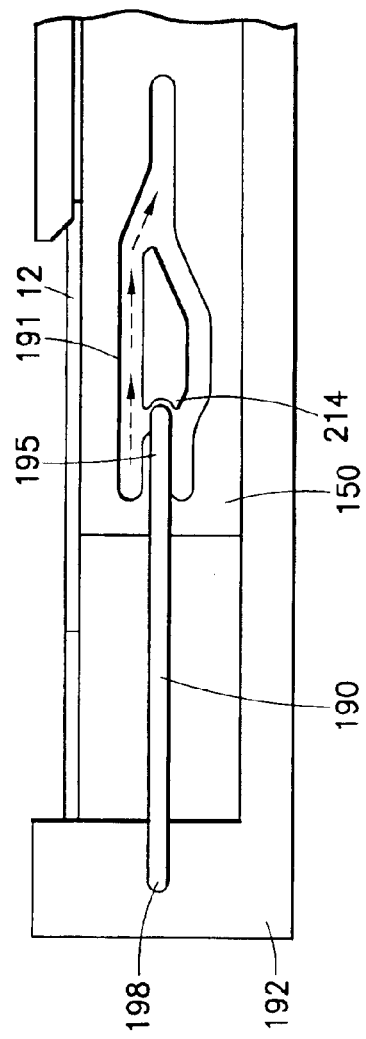
FIG. 19 is a side view of the side ejection mechanism in a mated or intermediate position.
Figure 22:
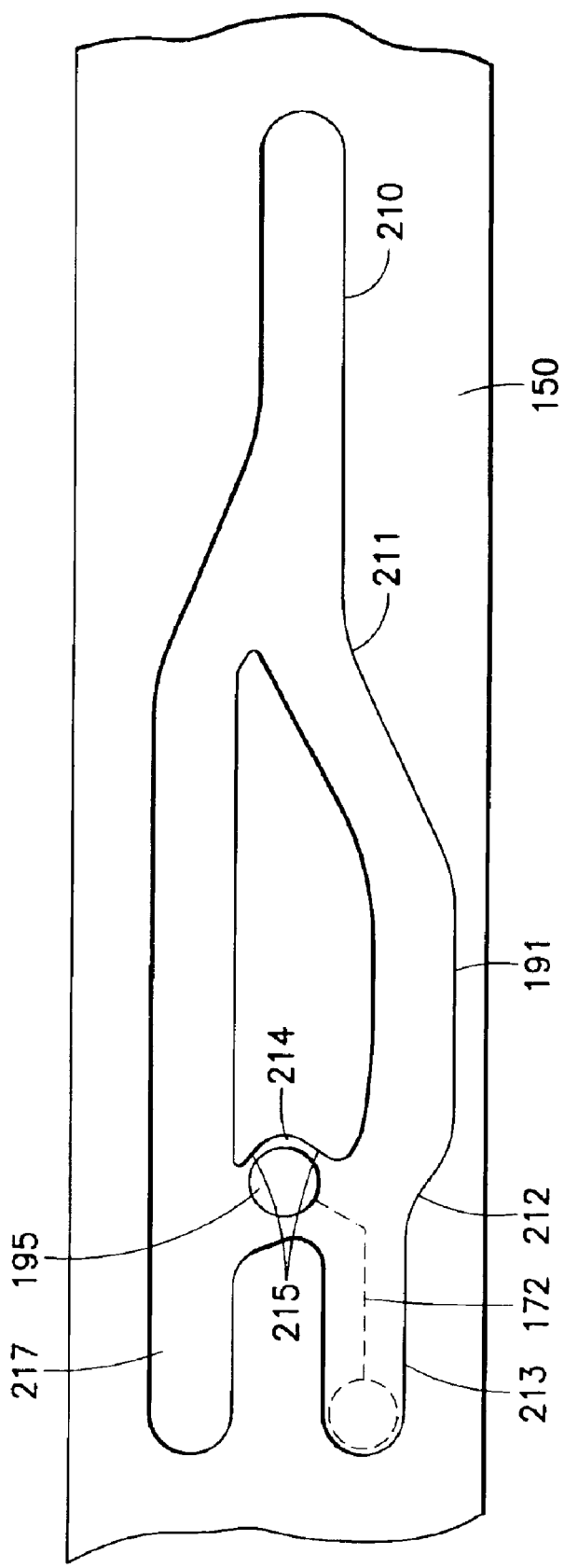
FIG. 22 is a side view of the pusher guide channel similar to FIG. 21 when the electronic module is at its mated position.

FIG. 19 shows the ejecting unit 150 at its inwardly latched position corresponding to FIG. 17. In this position, the pin 190 holds the ejecting unit 150 in an intermediate latched position with the pin head 195 being securely corralled within a detent or seat 214 of the pusher guide channel 191. As shown in FIG. 22, the design of the pusher guide channel 191 is such that, when the pusher 155 is moved from its over-moved, end position shown in FIGS. 16 and 21 to its mated position shown in FIGS. 17 and 22, the pin head 195 is encouraged upward into the detent 214 as indicated by dotted line 172, rather than in a downward fashion into the first uphill slope 212. The walls 215 of the detent 214 are pronounced enough that, when the pusher 155 is forced outward by the side spring 157, the pin head 195 is securely seated in the detent 214. Once the pin head 195 is engaged in the detent 214, the ejecting unit 150 is maintained in its latched position by the force from the spring 157. When the pin head 195 is maintained in the detent 214, the leading end 24 of the module 74 is generally positioned in the mating zone with its front end 24 at the rear end 152 of the mating zone. This generally corresponds to the positions shown in FIGS. 17, 19 and 22.

When the user wishes to remove the right module 74, the user again pushes on the rear end of the module 74. The inward movement of the module 74 causes an inward movement of the pusher 155 again. Referring to FIG. 23, as the pusher 155 moves forward, the pin head 195 is moved out of the detent 214 and, by way of a sloping back wall 216, the pin head 195 is driven upward into the third extension 217 as indicated by dotted line 174. The pin head 195 continues into the tail end of the third extension 217. Once the pin head 195 is in the tail end of the third extension 217 further forward movement is restricted because the front end of the module 74 once again contacts the front side of the rear wall of the frame 192 as shown in FIG. 16. The leading end 24 of the module 74 is positioned at the end zone 151.

Once inward movement of the module 74 is stopped, the user quickly releases the forward pressure on the module 74, and the spring 157 cause the outward movement of the ejecting unit 150 to push the module 74 outward along with the force from the right center spring 159. As the pusher 155 moves outward, the pin head 195 generally travels in a direction along the top side of the loop 200 back to its position shown in FIG. 20. The pin head 195 begins a descent on a second downward slope 218. Once the pin head has moved beyond the extent of the second downward slope 218, the pin head 195 moves into the first extension 210. The spring 157 pushes the pusher 155 outward, which causes the pin head 195 to move forward into the first extension 210, as shown in FIG. 20. When the pusher 155 contacts the rear end of the frame slot slidably holding the pusher, the travel ceases and the pin head 195 rests in the first extension 210. When the pin head 195 is in the first extension 210, the module 74 has been pushed outward to its partially ejected position. Accordingly, when the pin head 195 resides in the first extension 210, the leading end 24 of the module 74 is in the ejecting zone 153 with the module 74 being moved back to its position shown in FIG. 15; disconnected from the mechanical and electrical connection with the contacts 44.

Considering the operation of the ejecting system 140 as described above, one can see that a push-push system is established which is capable of repeatable engagement and disengagement of a module 74 in an electrical connector 14. Although described in terms of the pusher guide channel 191 generally presented herein, it is expected that other embodiments of pusher guide channels 191 may be realized. Accordingly, these other embodiments, and apparatus as may be required to operate in the manner described herein, should be considered as within the teachings of this disclosure. Similar to the first embodiment described above, rather than using the connector 130 to connect one or two of the modules 74 to the connector, the connector can have the larger width module 12 connected to it.

Figure 25:
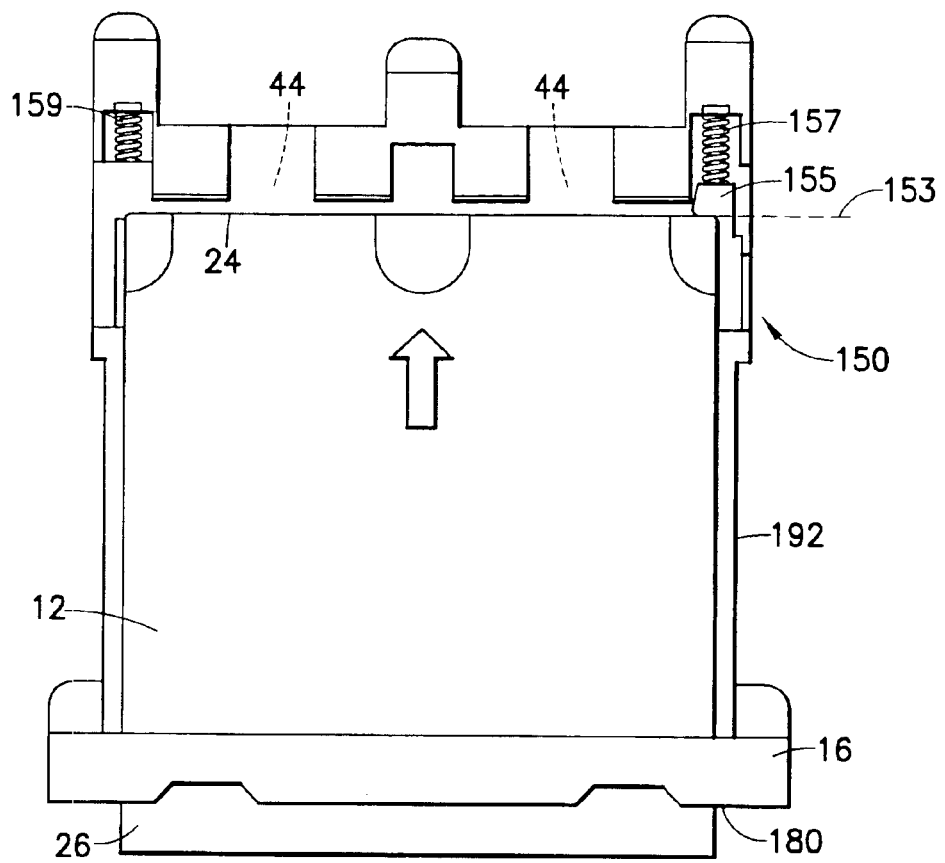
FIG. 25 is a top view schematic illustration of an alternate embodiment of the electrical connector with a single side mounted ejection mechanism and a control and support spring, and a double width (DW) electronic module received in the receiving area.
Figure 26:
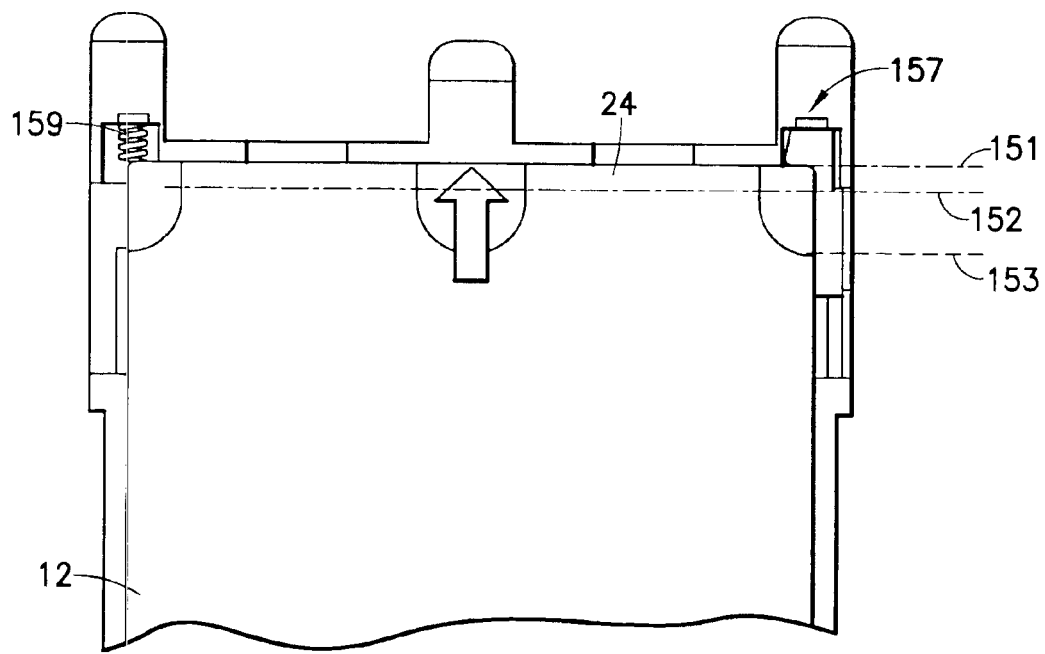
FIG. 26 is a top view schematic illustration of as in FIG. 25 with the electronic module moved from the partially ejected or initially inserted position shown in FIG. 25 to an over-inserted position in the receiving area.
Figure 27:
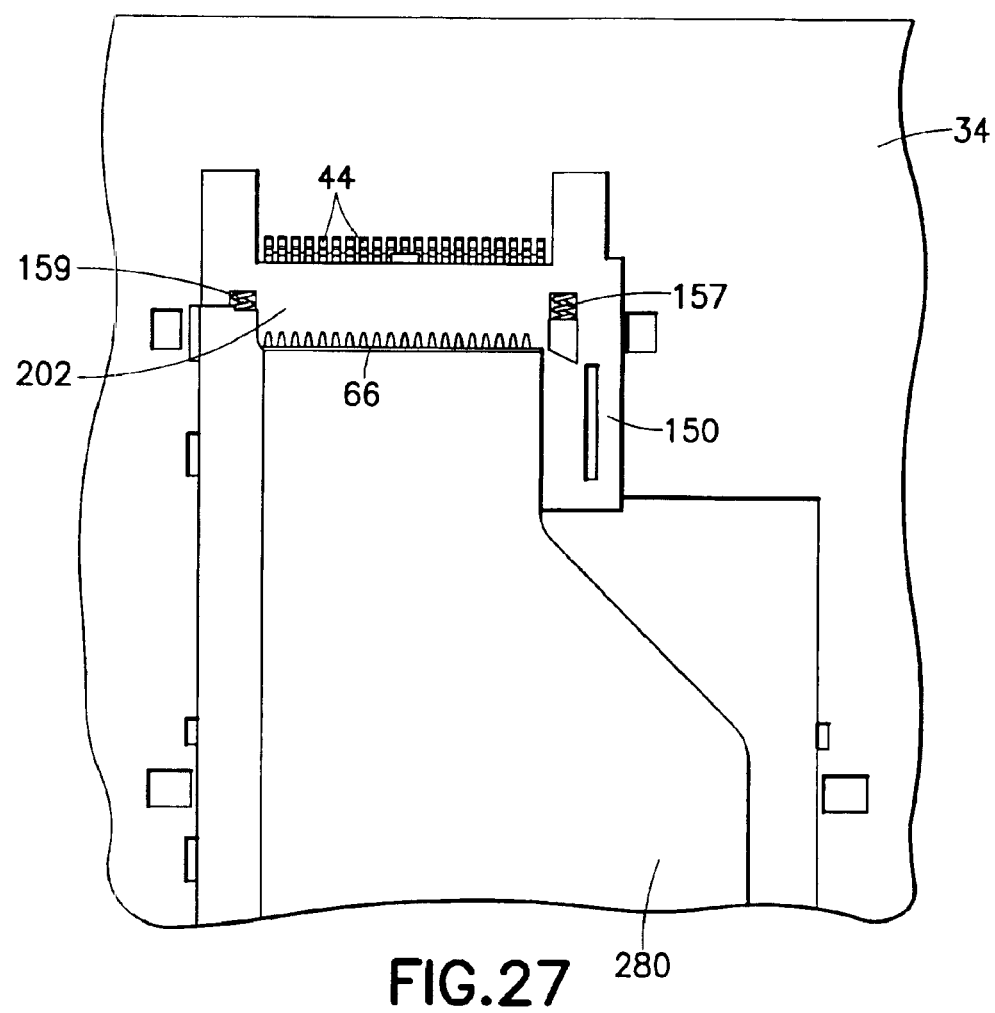
FIG. 27 is a top view of another alternate embodiment of an electrical connector incorporating features of the present invention on a printed circuit board.

Referring now to FIGS. 25–26, an alternate embodiment of the present invention is shown. In this embodiment the connector includes the frame 192, only one side mounted ejecting unit 150 and only one control and support spring 159. The spring 159 is located on the left side of the frame 192 rather than the center of the frame. The ejecting unit 150 is the same as the ejecting unit described above with reference to FIGS. 15–24. In FIG. 26, the wider module 12 is inserted into the module width receiving area 180. In this embodiment, the ejecting unit 150 is present on only the right side of the module 12. The left side of the connector does not have an ejecting unit 150. The control and support spring 159 is disposed on the opposite side of the electrical connector, as opposed to in the middle of the connector. The control and support spring 159 at least partially balances the forces applied by the ejecting unit 150 against the module 12 during the operation of the ejecting unit to prevent canting of the module 12 in the receiving area; which might otherwise prevent proper partial ejection of the module. FIG. 26 shows the same embodiment as in FIG. 25, with the module 12 inserted for mating with the electrical connector similar to the position shown in FIG. 16; with the module 12 moved to its over-inserted position. The front left corner of the module 12 contacts the spring 159. When the module is moved to its mated position in the mating zone after connection, the force exerted by the spring 159 against the module 12 substantially ceases, and the module 12 is held mechanically and electrically connected to the connector substantially merely by the frictional clamping forces from the contacts 44. The spring 159 is only compressed when the front end 24 of the module 12 is inserted past the rear end 152 of the mating zone. This embodiment illustrates that the ejecting unit(s) and control and support spring(s) can have various different quantities, locations and cooperating configurations on the frame of the connector.

Referring now to FIGS. 27–33 another alternate embodiment of an electrical connector incorporating features of the present invention is shown for connecting a module 331 (see FIGS. 32–33) to a printed circuit board 34. The connector 202 has a frame 204 with a module receiving area 280, electrical contacts 44, an ejecting unit 150 and a support spring 159. The electrical connector 202 has only one contact support section 66, and does not include the second contact support section 68. Thus, the electrical connection area at the contact support section 66 is not as wide as the receiving area 280 and, is almost half the size of the width of the receiving area 280.

Figure 30:
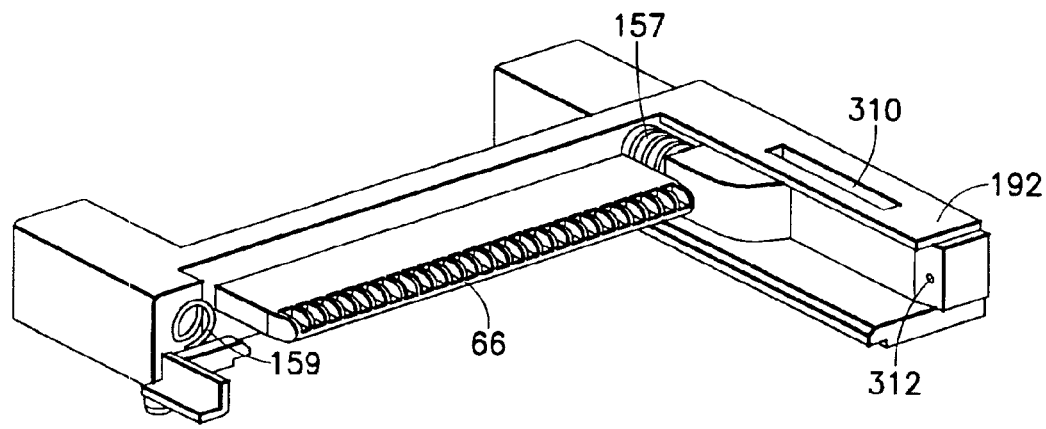
FIG. 30 is a perspective view of portions of the electrical connector shown in FIG. 27.
Figure 31:
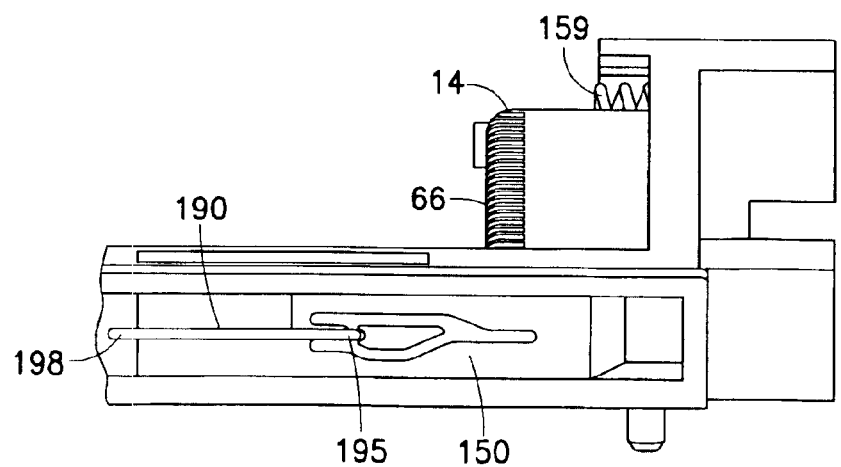
FIG. 31 is a perspective view of the portions of the electrical connector shown in FIG. 30 taken from another side.

As seen in FIG. 30, a sliding slot 310 is shown incorporated into the frame 192. In this embodiment, the sliding slot 310 is provided to provide a guide for a tab or other structure on the ejecting unit 150. Also shown in FIG. 30 is an assembly hole 312 for retention of the pin tail 198 (see FIG. 31). FIG. 31 provides a side view perspective of the embodiment shown in FIG. 30.

Figure 32:
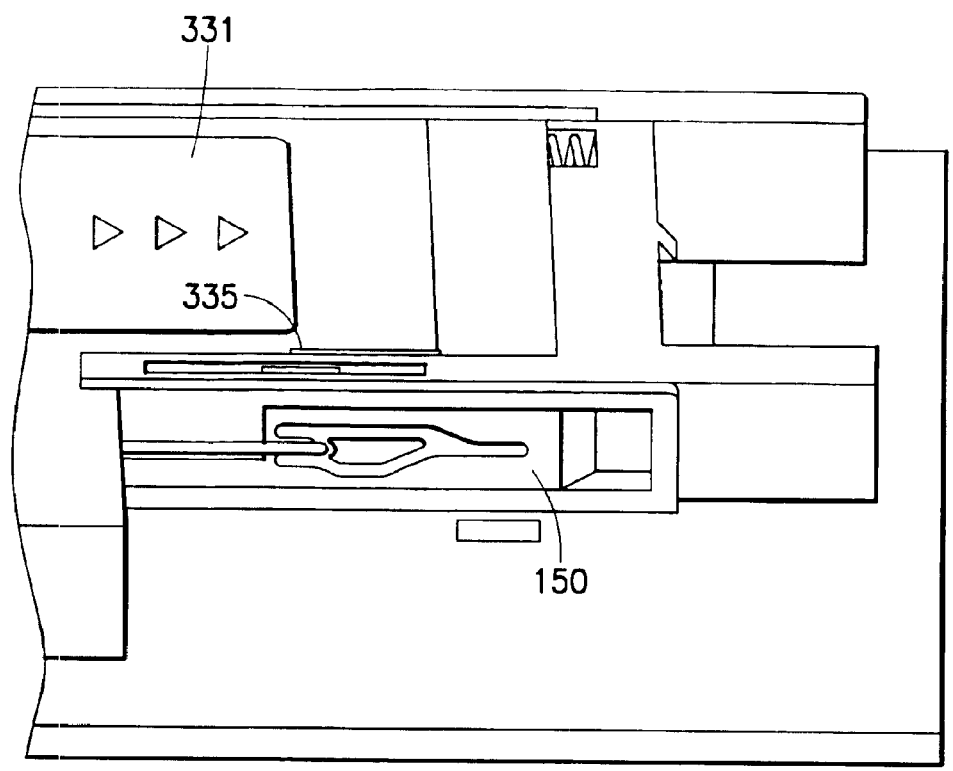
FIG. 32 is a partial perspective view a module in a mated position in the connector shown in FIG. 27.
Figure 33:
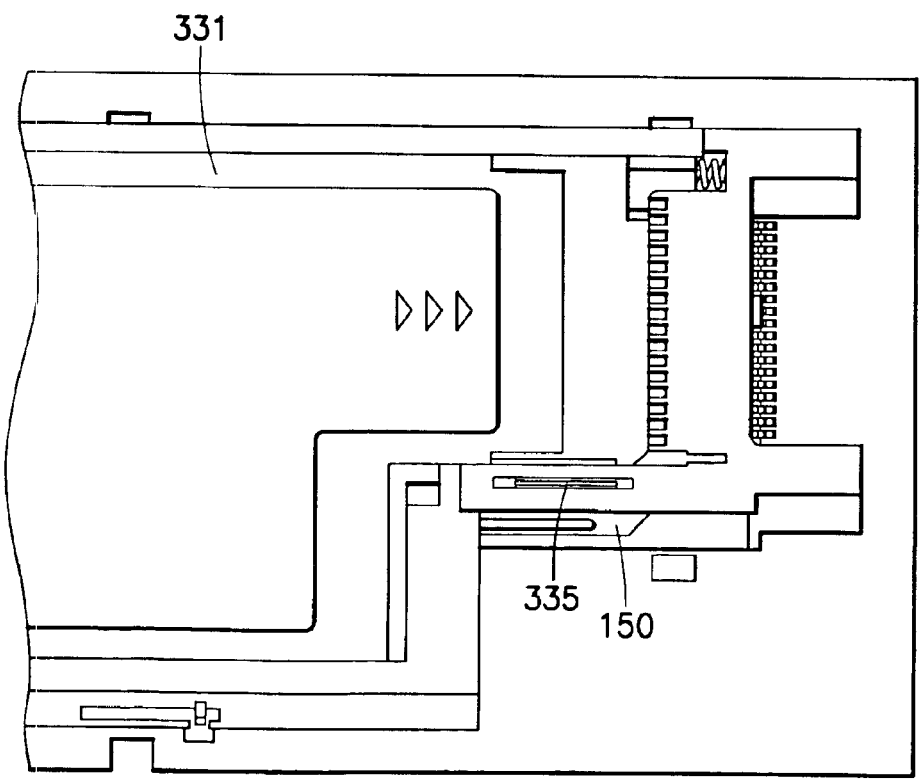
FIG. 33 is a partial perspective view of the module in a partially ejected position in the connector shown in FIG. 32.

As seen in FIGS. 32 and 33 the stepped width module 331 is shown inserted into the receiving area 280. A tab 335 on the ejecting unit 150 is shown in cooperation with the sliding slot 310 FIG. 32 depicts the module 331 in a mated position, while FIG. 33 depicts the module 331 in the partially ejected or initially inserted position.

Figure 34:
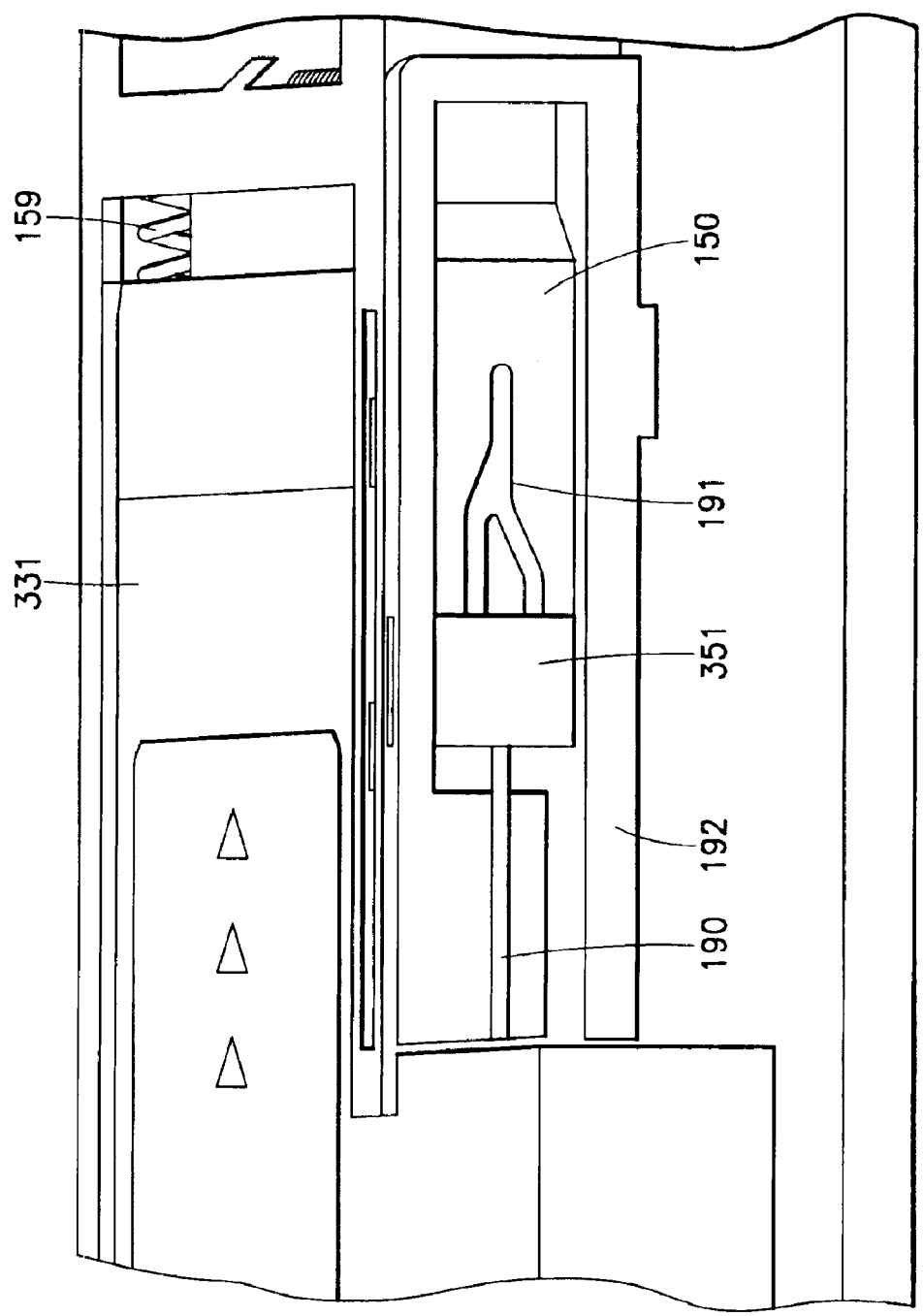
FIG. 34 depicts an optional contact blade for retention of the guide pin attached to the frame of the connector to retain an end of the guide pin in the guide channel.

Referring now to FIG. 34 another alternate embodiment is shown. In this embodiment a contact blade 351 is included at the ejecting unit 150. The contact blade 351 provides additional retention force for the pin 190. The contact blade 351 is mounted to the ejecting unit 150, or the frame 192. The contact blade 351 can exert an upward force on the head of the pin 190 when the head is in the rear section of the guide channel 191. This can insure proper path movement of the head in the guide channel regardless of orientation of the electronic device.

In conventional PCMCIA electrical connectors, a tension spring or a compression spring or ejection spring is loaded while the PCMCIA card is inserted (i.e., there is a stored spring force). This causes forces on various components, and the springs can weaken over time. With an electrical connector incorporating features of the present invention, no force against the electrical connector or electronic module results from at least one of the springs while the module is at its operational inserted position (i.e., there is no stored spring force in at least on of the ejection springs). A stored spring force is released only when the user pushes the electronic module past its operational mated position to an over-inserted position just before ejection. Thus, springs are less prone to permanent deformation, and the housing of the electrical connector is less prone to wear or breakage over time. There are also less parts than a conventional PCMCIA connector. This allows the connector to be manufactured at a reduced cost.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical connector comprising:
   a frame having a receiving area which is sized and shaped to removably receive an end of at least one electronic module;
   electrical contacts connected to the frame, the contacts comprising spring contacts adapted to make removable connection to contact pads on the end of the electronic module at a mated inserted position; and an ejecting system for ejecting the at least one electronic module with the electrical contacts, the ejecting system comprising at least one ejection unit having a spring, a pusher and a guide connected between the frame and a guide channel in the pusher, and wherein the ejection unit and frame are adapted to stationarily locate the pusher at two positions on the frame based upon biasing force of the spring and upon location of the guide in the guide channel, wherein the frame is adapted to receive two of the electric modules in a side-by-side configuration, and wherein the ejecting system comprises two of the ejection units located at opposite sides of the receiving area.

2. An electrical connector as in claim 1 further comprising a control and support spring connected to the frame and extending into the receiving area from a rear end of the receiving area, wherein the control and support spring is adapted to be deformed by the electronic module only when a front end of the electronic module is inserted past a mated inserted position in the receiving area.

3. An electrical connector as in claim 1 wherein the guide channel comprises a general loop shape with extensions extending off of the general loop shape.

4. An electrical connector as in claim 3 wherein the general loop shape comprises a detent section forming a seat for holding a portion of the guide thereat.

5. An electrical connector as in claim 3 wherein the guide comprises a rod having a first end pivotably connected to the frame and a second end slideably located in the guide channel.

6. An electrical connector as in claim 1 wherein the ejecting system comprises only one ejection unit located at a lateral side of the receiving area.

7. An electrical connector as in claim 1 wherein the guide track is sized and shaped to cooperate with the guide to form a latch for the pusher at a mated position of the electronic module in the receiving area.

8. An electrical connector comprising:
a frame having a receiving area which is sized and shaped to removably receive an end of at least one electronic module;
electrical contacts connected to the frame, wherein the electrical contacts are adapted to make removable connection with contacts on an electronic module inserted into the receiving area; and
an ejecting system for ejecting the electronic module from connection with the electrical contacts, wherein the ejecting system comprises a spring, a pusher connected to the spring and adapted to push against the electronic module, and a movable guide connected to the frame, wherein the pusher comprises a guide track, wherein the guide extends into the guide track, wherein the guide track is sized and shaped to cooperate with the guide to form a latch for the pusher at a mated position of the electronic module into the receiving area, and wherein in the mated position the electrical contacts make electrical connection with the electronic module and the latch prevents the spring from exerting a force against the electronic module, wherein the receiving area of the frame is adapted to receive two of the electric modules in a side-by-side configuration, and wherein the ejecting system comprises two of the ejection units located at opposite sides of the receiving area.

9. An electrical connector as in claim 8 further comprising a control and support spring connected to the frame and extending into the receiving area from a rear end of the receiving area, wherein the control and support spring is adapted to be deformed by the electronic module only when the end of the electronic module is inserted past the mated position in the receiving area.

10. An electrical connector as in claim 8 wherein the guide track comprises a general loop shape with extensions extending off of the general loop shape.

11. An electrical connector as in claim 10 wherein the general loop shape comprises a detent section forming a seat for holding a portion of the guide thereat.

12. An electrical connector as in claim 10 wherein the guide comprises a rod having a first end pivotably connected to the frame and a second end slideably located in the guide channel.

13. An electrical connector as in claim 8 wherein the ejecting system comprises only one ejection unit comprising the spring, the pusher and the guide located at a lateral side of the receiving area.

14. An electrical connector comprising:
a frame having a receiving area which is sized and shaped to removably receive a front end of at least one electronic module;
electrical contacts connected to the frame, wherein the electrical contacts are adapted to make removable connection with contacts on an electronic module inserted into the receiving area;
a control and support spring connected to the frame and extending into the receiving area from a rear end of the receiving area, wherein the control and support spring is adapted to be deformed by the electronic module only when a first side of the front end of the electronic module is inserted past a fully connected mated position in the receiving area, wherein the fully connected mated position comprises all electrical contact areas of the electronic module being electrically coupled to the electrical contacts, and wherein the control and support spring is not substantially deformed when the electronic module is at fully connected mated position or a partially ejected position in the receiving area;
a latchable ejecting unit connected to the frame comprising an ejecting unit spring, a pusher biased by the spring between an un-mated ejection position and an over-moved end position, and a latching system to latch the pusher at an intermediate latched position, wherein the pusher is contacted by the electronic module at a second side of the front end of the electronic module to move the pusher.

15. An electrical connector as in claim 14 wherein the frame is adapted to receive two of the electronic modules in a side-by-side configuration.

16. An electrical connector as in claim 15 wherein the connector comprises two of the latchable ejecting units located at opposite sides of the receiving area.

17. An electrical connector as in claim 14 wherein the the pusher comprising a guide channel comprises a general loop shape with channel extensions extending off of the general loop shape.

18. An electrical connector as in claim 17 wherein the general loop shape comprises a detent section forming a seat for holding a portion of the guide thereat.

19. An electrical connector as in claim 14 wherein the guide comprises a rod having a first end pivotably connected to the frame and a second end slideably located in the guide channel.

20. An electrical connector as in claim 14 wherein the pusher comprises a guide track which is sized and shaped to cooperate with the guide to form the latching system to latch the pusher at a mated position of the electronic module into the receiving area.

* * * * *